(12) United States Patent
Otani et al.

(10) Patent No.: US 6,631,373 B1
(45) Date of Patent: Oct. 7, 2003

(54) SEGMENTED DOCUMENT INDEXING AND SEARCH

(75) Inventors: Noriko Otani, Ageo (JP); Yuji Ikeda, Kawasaki (JP); Takaya Ueda, Yokohama (JP); Kenichi Fujii, Yokohama (JP); Fumiaki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/515,665

(22) Filed: Feb. 29, 2000

(30) Foreign Application Priority Data

| Mar. 2, 1999 | (JP) | ............................................. 11-053978 |
| Mar. 12, 1999 | (JP) | ............................................. 11-067174 |
| Mar. 23, 1999 | (JP) | ............................................. 11-077368 |

(51) Int. Cl.[7] .............................................. G06F 17/30
(52) U.S. Cl. .......................... 707/5; 707/104.1; 707/102
(58) Field of Search ............................ 707/3, 5, 6, 100, 707/104.1, 102

(56) References Cited

U.S. PATENT DOCUMENTS

| 5,404,435 A | * | 4/1995 | Rosenbaum ................ 707/515 |
| 5,598,557 A | * | 1/1997 | Doner et al. ................. 345/835 |
| 5,905,980 A | * | 5/1999 | Masuichi et al. ............... 707/1 |
| 6,002,798 A | * | 12/1999 | Palmer et al. ............... 382/176 |
| 6,256,622 B1 | * | 7/2001 | Howard et al. ................. 707/1 |
| 6,289,353 B1 | * | 9/2001 | Hazlehurst et al. .......... 707/101 |
| 6,292,796 B1 | * | 9/2001 | Drucker et al. ................. 704/9 |
| 6,292,802 B1 | * | 9/2001 | Kessenich et al. ........... 707/101 |

* cited by examiner

Primary Examiner—Greta Robinson
Assistant Examiner—Susan Rayyan
(74) Attorney, Agent, or Firm—Fitzpatrick, Cella, Harper & Scinto

(57) ABSTRACT

There is provided a text search apparatus capable of dividing a structured document such as an HTML document into segments, and presenting segments containing a given search key as the search result, thereby providing a part of the document matching the search condition as the result of search. The document is divided into segments by specified tags, and a level of association with an adjacent segment is calculated. A header is detected by a header tag, and the header information is added to the segment contained in the range of the header. Segments are divided and re-integrated according to the level of association therebetween, and indexes are prepared. A search is executed for two indexes, and the level of matching is calculated by weighting the search results for the indexes, and the search result judged according to such level of matching is stored or outputted for each segment.

67 Claims, 20 Drawing Sheets

FIG. 2

- AHEAD AND BEHIND `<Hn...>...</Hn>`
- AHEAD AND BEHIND `<PRE>...</PRE>`
- AHEAD AND BEHIND `<CENTER>...</CENTER>`
- AHEAD AND BEHIND `<OL...>...</OL>`
- AHEAD AND BEHIND `<UL...>...</UL>`
- AHEAD AND BEHIND `<DL...>...</DL>`
- AHEAD AND BEHIND `<TABLE..>...</TABLE>`
- AHEAD AND BEHIND `<IMG...>`
- BEHIND `<P>`
- BEHIND `<HR>`

FIG. 4

SEGMENT 1
ID 1
HTML `<H1>` ××××  LABORATORY'S HOME PAGE`</H1>`
TEXT ×××× LABORATORY'S HOME PAGE
INFO
IMG

SEGMENT 3
ID 3
HTML `<UL>`
`<LI><A HREF="gakkai.html">`PRESENTATION INFORMATION OF STUDY MEETING `</A>` WAS UPDATED. `</LI>`
`<LI><A HREF="search.html">`SEARCH SYSTEM `</A>` IS OPERATED ON TRIAL. `</LI>`
`</UL>`
TEXT PRESENTATION INFORMATION OF STUDY MEETING WAS UPDATED. SEARCH SYSTEM IS OPERATED ON TRIAL.
INFO
IMG

FIG. 3

```
  <HTML>
  <HEAD>
    <TITLE> xxxx LABORATORY'S HOME PAGE</TITLE>
  </HEAD>
  <BODY>
1 <H1> xxxx LABORATORY'S HOME PAGE</H1>
   <!-------------------------------------->
2 <H2>What's new!</H2>
3 <UL>
3   <LI><A HREF="gakkal.html">PRESENTATION INFORMATION OF STUDY MEETING </A> WAS UPDATED. </LI>
3   <LI><A HREF="searchl.html">SEARCH SYSTEM </A> IS OPERATED ON TRIAL. </L1>
3 </UL>
   <!-------------------------------------->
4 <H2>RESEARCH THEME</H2>
5 <IMG SRC="theme.gif" ALIGN=right>
6 IN xxxx LAB, ON THE BASIS OF BACKGROUND OF AAAAA,
6 RESEARCH IS ADVANCED FOR PURPOSE OF ESTABLISHMENT OF THE BASE TECHNOLOGY OF BBBBB AND CCCCC.
6 DDDDD, EEEEE AND FFFFF ARE MADE INTO RESEARCH THEME. <P>
7 <IMG SRC="1line.gif>
8 ON DDDDD,~~~~~~~~~~~~~.AND, *******.
8 ON EEEEE,$$$$$$$$$. OR, %%%%%%.
8 ON FFFFF,&&&&&&&&&&&. HOWEVER, #####.
   <!-------------------------------------->
9 <H2>PRESENTATION AT STUDY MEETING</H2>
10 <H3> 1998YEAR</H3>
11 <TABLE BORDER>
11   <TR> <TH>PRESENTATION DATE</TH> <TH>THEME</TH> </TR>
11   <TR> <TD>MARCH 2</TD> <TD>DEVELOPMENT OF ***</TD></TR>
11   <TR> <TD>MARCH 10</TD> <TD>ESTIMATION OF ***</TD></TR>
11 </TABLE>
12 <H3> 1997YEAR</H3>
13 <TABLE BORDER>
13   <TR> <TH>PRESENTATION DATE</TH> <TH>THEME</TH> </TR>
13   <TR> <TD>APRIL 23</TD> <TD>DEVELOPMENT OF $$$</TD></TR>
13   <TR> <TD>JUNE 1</TD> <TD>ESTIMATION OF $$$</TD></TR>
13   <TR> <TD>SEPTEMBER 18 </TD> <TD>IMPROVEMENT OF $$$</TD></TR>
13 </TABLE>
   <!-------------------------------------->
14 <HR>
15 <A HREF="/index.html">TO △△INSTITUTE'S HOME PAGE</A><P>
16 <ADDRESS>
16 MANAGER: △△INSTITUTE xxxx LABORATORY TARO SUZUKI
16 (<A HREF="mail to: taro@hogehoge.co.jp">taro@hogehoge.co.jp</A>)<BR>
16 LAST UPDATED DATE: MARCH 13 (FRIDAY), 1998
16 </ADDRESS>
  </BODY>
  </HTML>
```

FIG. 5

(a) WITHOUT TEXT SURROUNDING IMAGE

| AHEAD/BEHIND | TEXT | LINE CHANGE +TEXT | PARAGRAPH CHANGE+TEXT | OTHERS |
|---|---|---|---|---|
| TEXT | MM | MX | MX | MX |
| TEXT+LINE CHANGE | XM | AA | AB | AX |
| TEXT+PARAGRAPH CHANGE | XM | BA | BB | BX |
| OTHERS | XM | XA | XB | XX |

(b) ALIGN=right

| AHEAD/BEHIND | TEXT | LINE CHANGE +TEXT | PARAGRAPH CHANGE+TEXT | OTHERS |
|---|---|---|---|---|
| TEXT | AA | AB | AC | AX |
| TEXT+LINE CHANGE | BA | BB | BC | BX |
| TEXT+PARAGRAPH CHANGE | CA | CB | CC | CX |
| OTHERS | XA | XB | XC | XX |

(c) ALIGN=left

| AHEAD/BEHIND | TEXT | LINE CHANGE +TEXT | PARAGRAPH CHANGE+TEXT | OTHERS |
|---|---|---|---|---|
| TEXT | BA | BA | BB | BX |
| TEXT+LINE CHANGE | BA | BA | BB | BX |
| TEXT+PARAGRAPH CHANGE | CA | CA | CB | CX |
| OTHERS | XA | XA | XB | XX |

AS FOR DOUBLE CHARACTERS, WITHIN TABLE 1st CHARACTER MEANS DEGREE OF ASSOCIATION WITH SEGMENT AHEAD IMAGE. 2nd CHARACTER OF DOUBLE CHARACTERS MEANS DEGREE OF ASSOCIATION WITH SEGMENT BEHIND IMAGE DEGREE OF ASSOCIATION IS AS FOLLOWS.
M···IMAGE IS A PORTION OF INFORMATION
A···APPRECIABLY ASSOCIATING (SCORE 3)
B···ASSOCIATING (SCORE 2)
C···LIGHTLY ASSOCIATING (SCORE 1)
X···NOT ASSOCIATING
THESE ARE REGARDED AS "LINE CHANGE".···<BR>, <CENTER>
THESE ARE REGARDED AS "PARAGRAPH CHANGE".···<P>, <HR>

FIG. 6

- SEGMENT 6
  - ID 6
  - HTML IN ×××× LAB, ON THE BASIS OF BACKGROUND OF AAAAA, RESEARCH IS ADVANCED FOR PURPOSE OF ESTABLISHMENT OF THE BASE TECHNOLOGY OF BBBBB AND CCCCC. DDDDD, EEEEE AND FFFFF ARE MADE INTO RESEARCH THEME. <P>
  - TEXT IN ×××× LAB, ON THE BASIS OF BACKGROUND OF AAAAA, RESEARCH IS ADVANCED FOR PURPOSE OF ESTABLISHMENT OF THE BASE TECHNOLOGY OF BBBBB AND CCCCC. DDDDD, EEEEE AND FFFFF ARE MADE INTO RESEARCH THEME.
  - INFO
  - IMG SEGMENT 5, SCORE 3

- SEGMENT 8
  - ID 8
  - HTML <IMG SRC="line.gif">
    ON DDDDD,~~~~~~~~~~~~~. AND, *******.
    ON EEEEE,$$$$$$$$$. OR, %%%%%%.
    ON FFFFF,&&&&&&&&&&&. HOWEVER, ######.
  - TEXT ON DDDDD,~~~~~~~~~~~~~. AND, *******. ON EEEEE, $$$$$$$$$. OR, %%%%%%. ON FFFFF,&&&&&&&&&&&. HOWEVER, ######.
  - INFO
  - IMG

FIG. 7

- SEGMENT 8
  - ID 8
  - HTML <H2>RESEARCH THEME</H2>
    <IMG SRC="line.gif">
    ON DDDDD,~~~~~~~~~~~~~. AND, *******.
    ON EEEEE,$$$$$$$$$. OR, %%%%%%.
    ON FFFFF,&&&&&&&&&&&. HOWEVER, ######.
  - TEXT ON DDDDD,~~~~~~~~~~~~~. AND, *******. ON EEEEE, $$$$$$$$$. OR, %%%%%%. ON FFFFF,&&&&&&&&&&&. HOWEVER, ######.
  - INFO ×××× LABORATORY'S HOME PAGE/RESEARCH THEME
  - IMG SEGMENT 5, SCORE 1

- SEGMENT 11
  - ID 11
  - HTML <H3> 1998YEAR</H3>
    <TABLE BORDER>
      <TR> <TH>PRESENTATION DATE</TH> <TH>THEME</TH> </TR>
      <TR> <TD>MARCH 2</TD> <TD>DEVELOPMENT OF ***</TD></TR>
      <TR> <TD>MARCH 10</TD> <TD>ESTIMATION OF ***</TD></TR>
    </TABLE>
  - TEXT PRESENTATION DATE THEME MARCH 2 DEVELOPMENT OF * MARCH 10 ESTIMATION OF *
  - INFO ×××× LABORATORY'S HOME PAGE/PRESENTATION AT STUDY MEETING/1998YEAR
  - IMG

SEGMENTED DOCUMENT INDEXING AND SEARCH

BACKGROUND OF THE INVENTION

1. Field of the Invention

The present invention relates to an index preparing apparatus for preparing an index from a document, a method therefor, also a document search apparatus for searching a document containing an entered search character train, a method therefor, a document search system and a storage medium (memory medium).

2. Related Background Art

The document search apparatus generally presents documents containing a given search key as the result of search. The result of search is given a score according to the level of matching with the searching condition, and a document with a high score is presented as the document of the result of search.

However, in the above-mentioned conventional apparatus in observing the content of the document of the result of search in searching the documents on the WWW, the entire document is presented so that it is often difficult to find a portion matching the searching condition in case the document is long or in case the document contains plural subjects.

The documents on WWW often contain plural information in a document and are often too long for observation at a glance. Therefore, in order to obtain the desired information from the document obtained as the result of search, it is necessary to look for a portion matching the searching condition.

The desired information is difficult to find if the document of the result of search contains information not matching the searching condition.

Also in case of observation with an equipment with a small display area such as a mobile terminal, the desired information alone should be presented since the ability to observe the information at a glance is limited.

SUMMARY OF THE INVENTION

In consideration of the foregoing, an object of the present invention is to provide a document search apparatus and a method therefor, capable of dividing an HTML document into segments based on the structure and content thereof, and presenting a segment containing the given search key, thereby providing a portion of the document matching the search condition as the result of search.

Another object of the present invention is to provide a document search apparatus and a method therefor, capable of starting from the search of a fine unit such as a segment and enlarging the unit of search according to the number of the results of search, thereby realizing a document search capable of automatically utilizing plural search units in different manners.

Still another object of the present invention is to provide a document search apparatus and a method therefor, allowing to obtain the intended result of search easily.

The above-mentioned objects can be attained, according to the present invention, by an index preparation apparatus for preparing, in a document, a search index of a searched document containing characters interpretable as a command by an apparatus for processing such document, the apparatus comprising searched document holding means for holding the searched document, document dividing means for extracting, from the searched document held by the searched document holding means, a first segment according to the characters interpretable as the command, cohesion processing means for uniting the first segments according to the correlation thereof to form a second segment, and index preparing means for preparing the search index for each of the second segments.

BRIEF DESCRIPTION OF THE DRAWINGS

FIG. 2 is a view showing an example of dividing positions of an HTML document in an embodiment of the present invention;

FIG. 3 is a view showing an example of the searched document in an embodiment of the present invention;

FIG. 4 is a view showing an example of the first segment prepared from the HTML document shown in FIG. 3, in an embodiment of the present invention;

FIG. 5 is a view showing an example of the association rule between an image and an adjacent segment in an embodiment of the present invention;

FIG. 6 is a view showing an example of the second segment prepared from the HTML document shown in FIG. 3, in an embodiment of the present invention;

FIG. 7 is a view showing an example of the third segment prepared from the HTML document shown in FIG. 3, in an embodiment of the present invention;

BRIEF DESCRIPTION OF THE PREFERRED EMBODIMENTS

Now the present invention will be clarified in detail by preferred embodiments thereof, with reference to the attached drawings.

Figure 1:
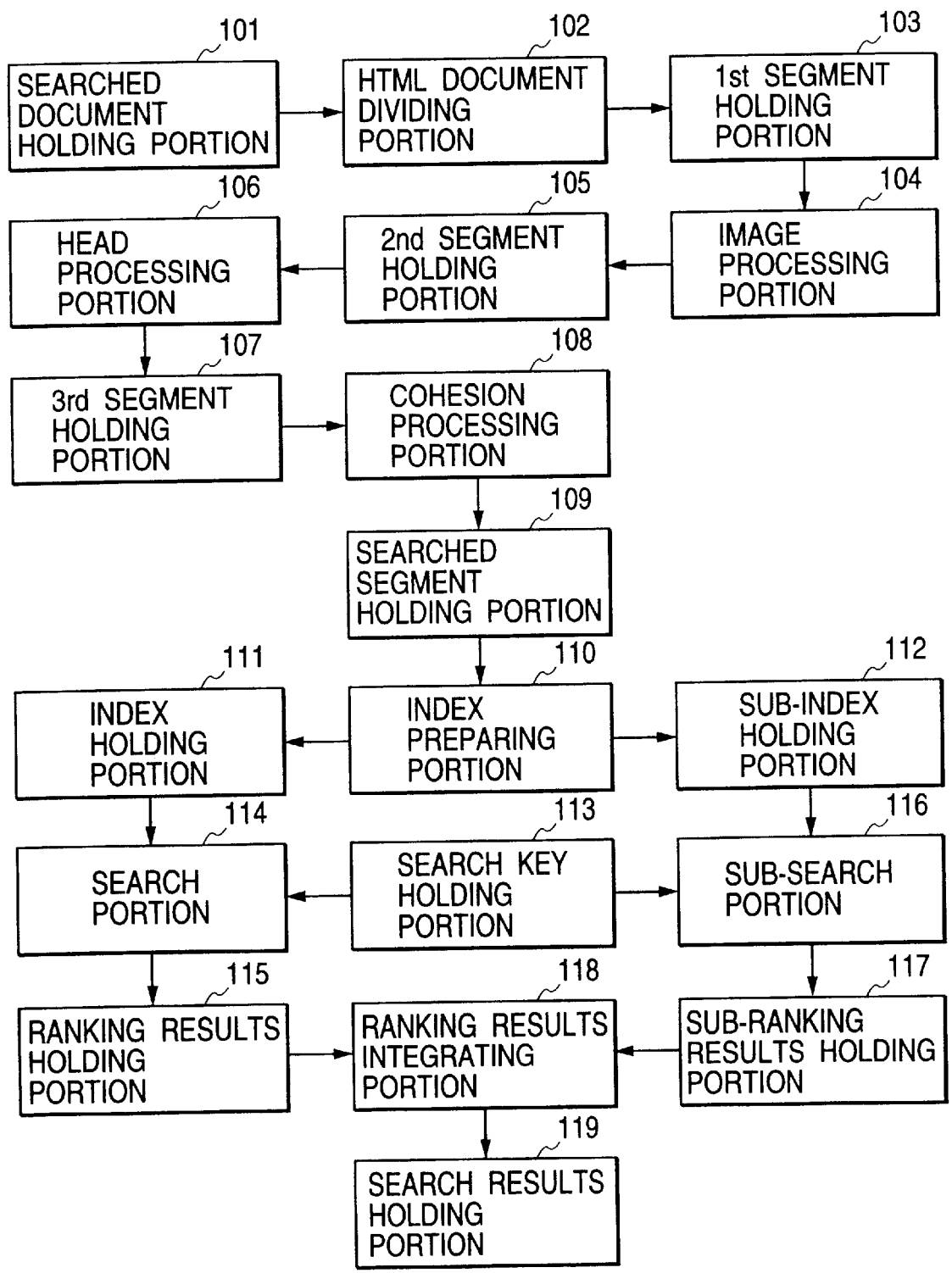
FIG. 1 is a block diagram showing the functional configuration of a text search apparatus embodying the present invention.

FIG. 1 is a block diagram showing the functional configuration of a text search apparatus constituting an embodiment of the present invention.

In FIG. 1, there are provided a search document holding portion 101 for holding a document to be searched; and an HTML document dividing portion 102 for dividing the searched document held by the searched document holding portion 101, according to HTML tags. The HTML document, constituting the searched document, is subjected to the extraction of a main text (between <BODY>and </BODY>), then to the elimination of portions not constituting the object of search, such as comment (<!- - . . . - ->) or meta tag (<META . . . >), and then to division at pre-defined positions to generate segments.

FIG. 2 shows an example of dividing positions. A segment is composed of a segment number (ID), a text representing the content of segment by HTML (HTML), a text obtained by eliminating tags from HTML (TEXT), a sub information (INFO) and image information (IMG). FIG. 4 shows examples of segments prepared from the HTML document shown in FIG. 3, in which the number at the head of each row indicates a segment number.

A first segment holding portion 103 holds the segment generated by the HTML document dividing portion 102, and an image processing portion 104 calculates the level of association of segments held by the first segment holding portion 103 and adjacent to an image (<IMG . . . >) thereby generating a second segment. The level of association is determined by the image position (presence/absence of text surrounding the image), and the presence/absence of preceding or succeeding line change or paragraph change. More specifically, the kind is not discriminated on the entire preceding or succeeding segment but the kind is discriminated on a row each, adjacent to the image segment, within the rows constituting the preceding and succeeding segments, and the level of association is determined.

FIG. 5 shows an example of the rule of association. For a level M of association, the image segment is united with the adjacent segment. For a level A, B or C of association, the IMG of the adjacent segment is given the ID of the image segment and a score corresponding to the level of association. In FIG. 5, "line change (or paragraph change)+text" means a configuration:

<IMG SRC=. . . >

<BR>(or <R>) (arbitrary text).

In the example of the HTML document shown in FIG. 3, a segment 7 <IMG SRC="line.gif"> has an adjacent row consisting of text+paragraph change in the preceding segment 6 and an adjacent row consisting of text in the succeeding segment 8, so that the level of association becomes XM. Therefore the segment M is united with the segment 8 of a level M of association. On the other hand, a segment 5 <IMG SRC="theme.gif" ALIGN=right> has an preceding segment 4 classified as others and an adjacent row consisting of text in the succeeding segment 6, so that the level of association becomes XA according to a table (b) in FIG. 5. Therefore the image information IMG of the segment 6 having an association level A is given the ID (segment 5) and the score (3). FIG. 6 shows the segments 6 and 8 after the image processing.

A second segment holding portion 105 holds the segment generated by the image processing portion 104, and a header processing portion 106 executes a process relating to a header (<Hn . . . > . . . </Hn . . . >) on the segments held by the second segment holding portion 105, thereby generating a third segment. The process for the header is executed in the following sequence:

1. Pick up a segment for the header;
2. If there is a large header (<H1 . . . > . . . </H1 . . . >) in the beginning, add the header to the INFO of all the segments;
3. Determine the range of the header, and add the header to the INFO of the segments in such range. If plural headers are present, they are arranged in the decreasing order, starting from the larger one and separated by a separator (for example "/");
4. Add the smallest header to the HTML of the segments within the range of the header;
5. ADD, to the IMG, the segment number and score of the image (ununited one) with the same range of the header;
6. Delete the segment of the header.

Therefore, in the example of the HTML document shown in FIG. 3, the header processing portion 106 executes the following processes:

1. There are picked up the segments 1, 2, 4, 9, 10 and 12 containing the header tag <Hn></Hn>;
2. A header "home page of xxxx laboratory" placed between tags <Hn> and </Hn> is added to the INFO of all the segments;
3. The range of the segment 2 becomes segment 3; the range of the segment 4 becomes segments 5, 6, 7 and 8; the range of the segment 9 becomes segments 10, 11, 12 and 13; the range of the segment 10 becomes segment 11; and the range of the segment 12 becomes segment 13. The header is added to the INFO of the segments contained in the range of the header. For example the "research theme" of the segment 4 is added to the INFO of the segment 8, and the "presentation at study meeting/1998 year" of the segments 9, 10 is added to the INFO of the segment 11;

4. For example "<H2> research theme </H2>" is added to the HTML of the segment 8, and "<H3> 1998 year </H3>" is added to the HTML of the segment 11;

5. "segment 5, score 1" is added to the IMG of the segment 8; and

6. Segments 1, 2, 4, 9, 10 and 12 are deleted.

FIG. 7 shows the segments 8 and 11 after the header processing.

A third segment holding portion 107 holds the segments generated by the header process portion 106, and a cohesion process portion 108 divides, among the segments held by the third segment holding portion 107, segment holding portion 107, segments with sizes exceeding a predetermined threshold value according the situation of appearance of the words.

At first, based on the punctuation marks or line change, the TEXT of the segment to be processed is divided into sentences, and the cohesion between two sentences is determined by extracting the words therein by analysis of the form elements. The vocabulary cohesion of sentences u, v can be defined, utilizing a constant λ, by the following equation:

$$w(u, v) = \exp(\lambda x)$$

wherein x is the number of words in the sentence u appearing also in the sentence v.

Also an evaluation function E is defined as following, with constants α, β:

$$E = \alpha \cdot \sum_{p_i \in T} \left( \sum_{s_j \neq s_k \in p_i} \frac{w(s_j, s_k)}{|p_i|} - \sum_{s_j \in p_i, s_k \notin p_i} \frac{w(s_j, s_k)}{|p_i|} \right) - \beta \cdot \sum_{p_i \in T} \left( \sum_{s_j \in p_i} l(s_j) - \frac{\sum_{p_j \in T} \sum_{s_k \in p_j} l(s_k)}{|T|} \right)^2$$

$T = \{p_1, p_2, \ldots, p_n\}$: text consisting of paragraphs $P_1$, $p_2 \ldots, p_n$ $p_j = \{s_j, s_{j+1}, \ldots, s_k\}$: paragraph consisting of sentences $s_j$, $s_{j+1}, \ldots, s_k$ $l(s_i)$: number of characters of sentence $s_i$ $w(s_i, s_j)$: vocabulary cohesion of sentences $S_i$ and $S_j$ $|S|$: number of elements of group S The constant λ used for determining the vocabulary and the constants α, β of the evaluation function E can be suitably selected from positive values, for example λ=5 and α=β=1. The evaluation function provides the entire evaluation for a certain combination of sentences, and can be used for dividing a paragraph into sentences (or groups of adjacent sentences) of a high cohesion. More specifically, a sentence is taken at first as a paragraph, and the evaluation function E is determined for each set of adjacent paragraphs and a paragraph showing the largest increase in the evaluation function, in comparison with that prior to the integration, is integrated. This operation is repeated until the evaluation function no longer shows improvement.

In the following there will be explained the function of the cohesion processing portion in an example where the TEXT of a segment is composed of 5 sentences A to E.

(1) The evaluation function value E (taken as E0) is determined in a state where the sentences are not integrated (A, B, C, D, E), namely the evaluation function E where Pj={Sj}.

(2) E is determined in cases where the adjacent sentences are integrated. By representing the combination of the sentences A and B by A+B, there are respectively determined:

evaluation function value (E1) for A+B, C, D, E;
evaluation function value (E2) for A, B+C, D, E;
evaluation function value (E3) for A, B, C+D, E; and
evaluation function value (E4) for A, B, C, D+E.

(3) Among E1 to E4, if the largest one (assumed to be E2) is larger than E0 (E2>E0), the sentences are combined in a state where such E is obtained. Thus the sentences B and C are combined to obtain a configuration A, B+C, D, E.

(4) E is again determined in cases where the adjacent sentences (or combined sentences) are combined, in the following manner:

evaluation function value (E5) for A+B+C, D, E;
evaluation function value (E6) for A, B+C+D, E; and
evaluation function value (E7) for A+B+C, D+E.

(5) There is adopted a configuration showing the largest increased in the evaluation function value (assumed to be E7), so that the sentences D and E are combined to obtain a configuration A, B+C, D+E.

(6) E is again determined in cases where the adjacent sentences (or combined sentences) are further combined, in the following manner:

evaluation function value (E8) for A+B+C, D+E; and
evaluation function value (E9) for A, B+C+D+E.

(7) There is adopted a configuration showing the largest increase in comparison with the state prior to the integration (E7 in this case). If there is not change, the configuration is fixed. In this example, if E8 or E9 is same as E7, the final configuration is divided into three sentences (or paragraphs) A, B+C, D+E providing the value E7.

The sentence (or paragraph) thus divided is a group of sentences having strong cohesion in the content.

A searched segment holding portion 109 holds the segments generated by the cohesion process portion 108.

An index preparing portion 110 prepares an index for achieving high-speed search, for the searched segment held in the searched segment holding portion 109. The index is prepared separately for each of the TEXT and INFO of each segment. An index holding portion 111 holds the index prepared by the index preparing portion 110, for the TEXT of the searched segment held by the searched segment holding portion 109. Also a sub index holding portion 112 holds a sub index prepared by the index preparing portion 110, for the INFO of the searched segment held by the searched segment holding portion 109. Also a search key holding portion 113 holds a character train to be used for searching.

A searching portion 114 searches, utilizing the index held by the index holding portion 111, a character train coinciding with the search character train held by the search key holding portion 113. The results of search are ranked according to the level of matching with the search condition. For the level of matching, there can be employed the number of appearances of the search key or the proportion occupied by the search key in the searched text. A ranking result holding portion 115 holds the result of ranking prepared by the search unit 114.

A sub search portion 116 searches, utilizing the sub index held by the sub index holding portion 112, a character train coinciding with the search character train held in the search key holding portion 113. As in the search unit, the results of search are ranked according to the level of matching with the search condition. A sub ranking result holding portion 117 holds the result of sub ranking prepared by the sub search portion 116.

A ranking result integrating portion 118 integrates the ranking result held in the ranking result holding portion 115 and the sub ranking result held in the sub ranking result holding portion 117, thereby generating the result of search. In this operation, a search score is calculated by adding the score of the ranking result and $\epsilon$ (<1) times of the score of the sub ranking result. Segments having search scores higher than a predetermined value constitute the results of search. A search result holding portion 119 holds the search results prepared by the ranking result integrating portion 118. In case the score exceeds a predetermined value, there may be outputted the corresponding image as the display of the result after the search. Thus the search score can be utilized for weighting the search results or as a condition for process branching.

Figure 8:
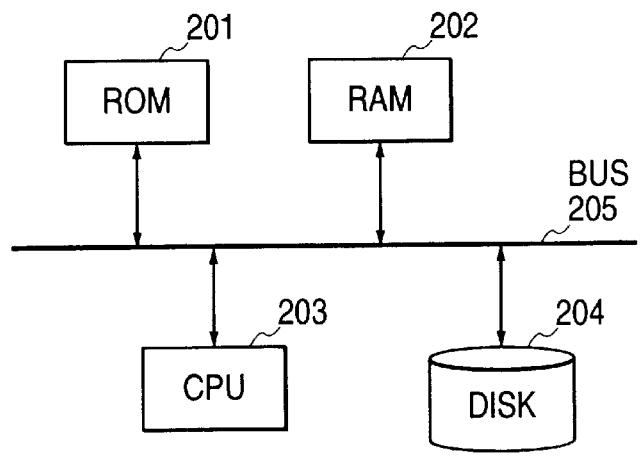
FIG. 8 is a block diagram showing the hardware configuration of a text search apparatus embodying the present invention.

FIG. 8 is a view showing the hardware configuration of the text search apparatus embodying the present invention, wherein shown are a ROM 201 for holding a program realizing the control sequence to be explained later; a RAM 202 for providing memory areas required for the first segment holding portion 103, second segment holding portion 105, third segment holding portion 107, index holding portion 111, sub index holding portion 112, search key holding portion 113, ranking result holding portion 115, sub ranking result holding portion 117, search result holding portion 119 and for the execution of the above-mentioned program; a central processing unit 203 for executing the process according to the program held in the ROM 201; a disk device 204 realizing the search document holding portion 101 and the searched segment holding portion 109; and a bus 205 for connecting the above-described components and enabling data exchange among such components.

Figure 9:
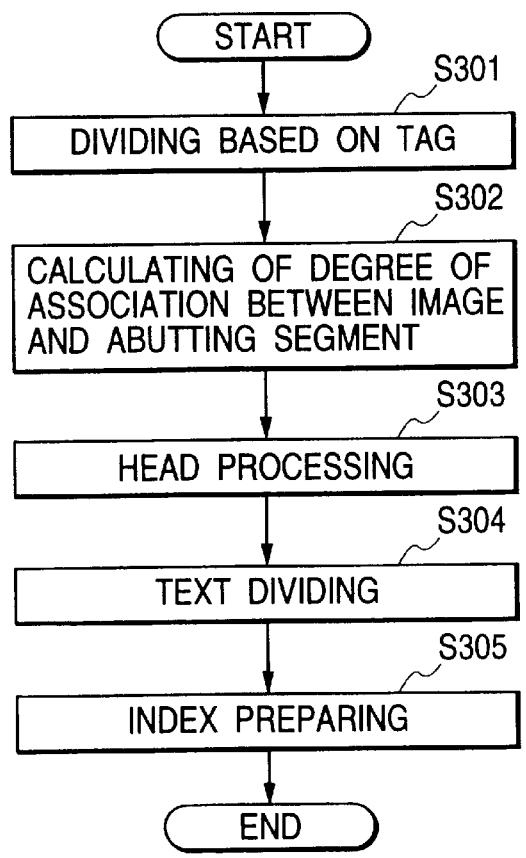
FIG. 9 is a flow chart outlining the index preparing phase in an embodiment of the present invention.

In the following there will be explained the function of the present apparatus. The process of the present embodiment is roughly divided into an index preparation phase and a search phase. In the following there will be explained the sequence of the index preparation phase in the text search apparatus of the present embodiment, with reference to a flow chart in FIG. 9.

A step S301 causes the HTML document dividing portion 102 to extract the main text (between <BODY> and </BODY>) from a searched document held in the searched document holding portion 101, then eliminate portions such as comment (<!- - . . . - ->) and meta tag (<META . . . >) which are not subjected to search, and execute division in the positions shown in FIG. 2 to generate first segments, whereupon the sequence proceeds to a step S302.

A step S302 causes the image processing portion 104 to calculate the level of association of a first segment, among the first segments generated in the step S301, adjacent to an image (<IMG . . . >) to generate a second segment.

A step S303 causes the header processing portion 106 to execute a process on the header (<Hn> . . . </Hn>) on the second segment generated in the step S302.

A step S304 causes the cohesion processing portion 108 to divide, among the third segments generated in the step S303, those having sizes exceeding a predetermined threshold value, according to the state of appearance of words, thereby generating searched segments.

A step S305 causes the index preparing portion 110 to prepare an index for achieving high-speed search on the searched segment generated in the step S304, whereupon the index preparation phase is terminated.

Figure 10:
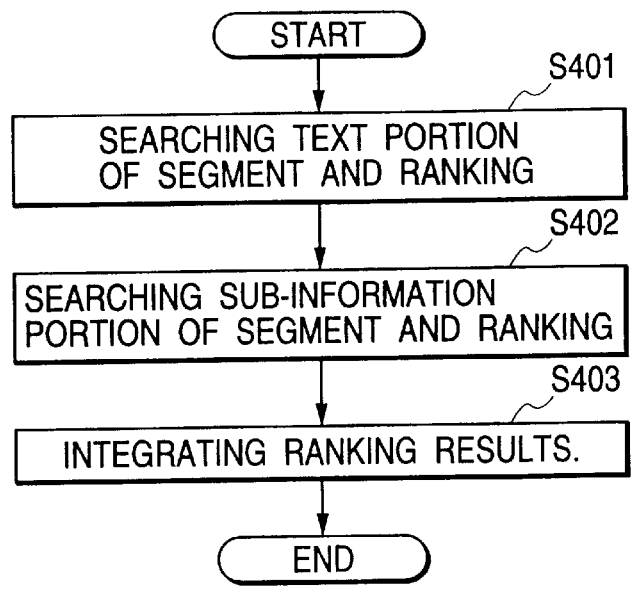
FIG. 10 is a flow chart outlining the searching phase in an embodiment of the present invention.

In the following there will be outlined the search phase in the present embodiment, with reference to a flow chart in FIG. 10.

A step S401 causes the search portion 114 to search, utilizing the index held in the index holding portion 111, a character train coinciding with the search character train held in the search key holding portion 113, and to rank the results of search according to the level of matching with the search condition, whereupon the sequence proceeds to a step S402.

A step S402 causes the sub search portion 116 to search, utilizing the sub index held in the sub index holding portion 112, a character train coinciding with the search character train hold in the search key holding portion 113, and to rank the results of search according to the level of matching with the search condition.

A step S403 causes the ranking result integrating portion 118 to integrate the ranking result generated by the step S401 and the sub ranking result generated by the step S402, thereby preparing the search result, whereupon the search phase is terminated.

As explained in the foregoing, there can be realized a text search apparatus which divides the HTML document into segments according to the structure and content and presents a segment containing the given search key as the search result, thereby providing a document portion matching the search condition as the result of search.

Second Embodiment

In the first embodiment, the searched segment generation process and the index preparation process in the index preparation phase, and the search phase, are executed within a same apparatus, but these processes may also be executed in different apparatus. For example there may be utilized any of an apparatus for executing the searched segment generation process only of the present invention, an apparatus for executing the index preparation process only and an apparatus for executing the search process only, or a system consisting of a combination of such apparatus.

(Searched Segment Generating Apparatus)

Figure 11:
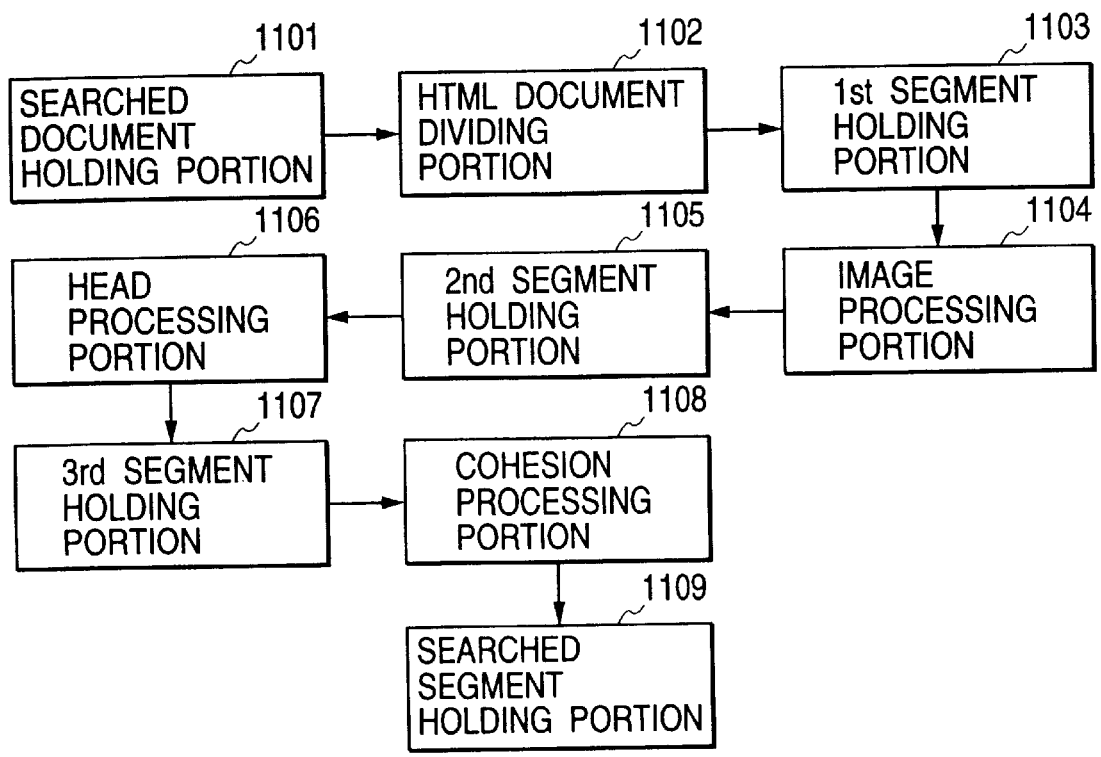
FIGS. 11 and 12 are block diagrams showing the basic configuration of a second embodiment of the present invention.

FIG. 11 is a block diagram showing the functional configuration of a searched segment generating apparatus according to the present invention.

Referring to FIG. 11, there are shown a searched document holding portion 1101 for holding a searched document; an HTML document dividing portion 1102 for dividing the searched document held in the searched document holding portion 1102, according to HTML tags; a first segment holding portion 1103 for holding segments generated by the HTML document dividing portion 1102; and an image processing portion 1104 for calculating the level of association of segments, among those held in the first segment holding portion 1103, adjacent to an image, thereby generating a second segment.

There are also shown a second segment holding portion 1105 for holding the segments generated by the image processing portion 1104; a header processing portion 1106 for executing a header process on the segments held by the second segment holding portion 1105 thereby generating a third segment; a third segment holding portion 1107 for holding the segment by the header processing portion 1106; a cohesion process portion 1108 for dividing, among those held by the third segment holding portion 1107, those having sizes exceeding a predetermined threshold value according to the state of appearance of words; and a searched segment holding portion 1109 for holding the segments generated by the cohesion processing portion 1108.

The searched segments held in the searched segment holding portion 1109 are transferred to and utilized in another apparatus, for example through a communication line or by a portable recording medium.

(Index Preparing Apparatus)

Figure 12:
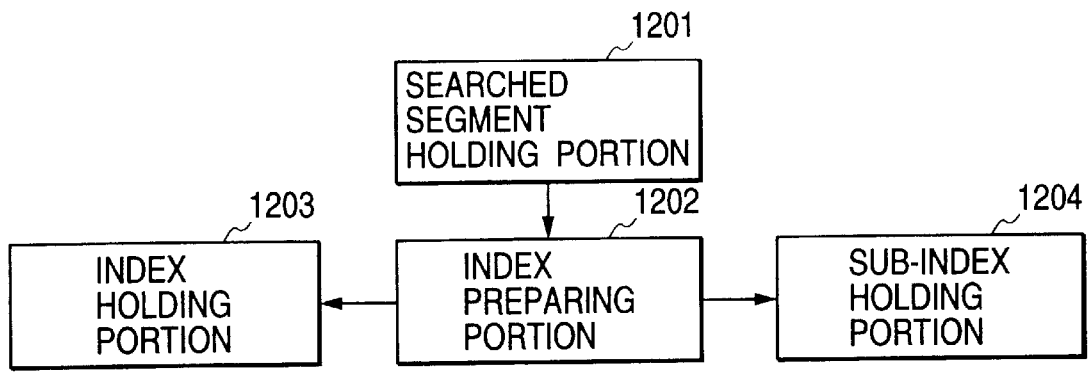

FIG. 12 is a block diagram showing the configuration of an index preparing apparatus of the present invention, wherein shown are a searched segment holding portion 1201 for holding the searched segments prepared in the apparatus shown in FIG. 11; an index preparing portion 1202 for preparing an index for achieving high-speed search on the searched segment held in the searched segment holding portion 1201; an index holding portion 1203 for holding the index prepared by the index preparing portion 1202, for the TEXT of the searched segment held in the searched segment holding portion 1201; and an index holding portion 1204 for holding the sub index prepared by the index preparing portion 1202, for the INFO of the searched segment held in the searched segment holding portion 1201.

Preparation of index from the TEXT or INFO of the searched segment can be achieved, for example, by:

(1) a method of holding the number of appearances, in each document, of a key constituted by a word obtained by division by the form element analysis or at the font change;

(2) a method of listing the positions of appearances, utilizing a key similar to that in (1); and (3) a method of listing the positions of appearances, for all the characters or character trains of N characters (N being a natural number).

The index held in the index holding portion 1203 and the sub index held in the sub index holding portion 1204 are transferred to and subjected to search in another apparatus, through a communication channel or by a portable memory medium.

Third Embodiment

In the second embodiment, the searched segment generation process and the index preparation process are executed in separate apparatus, but there may be constituted an apparatus for executing the searched segment generation process and the index preparation process.

(Apparatus for Searched Segment Generation and Index Preparation)

Figure 13:
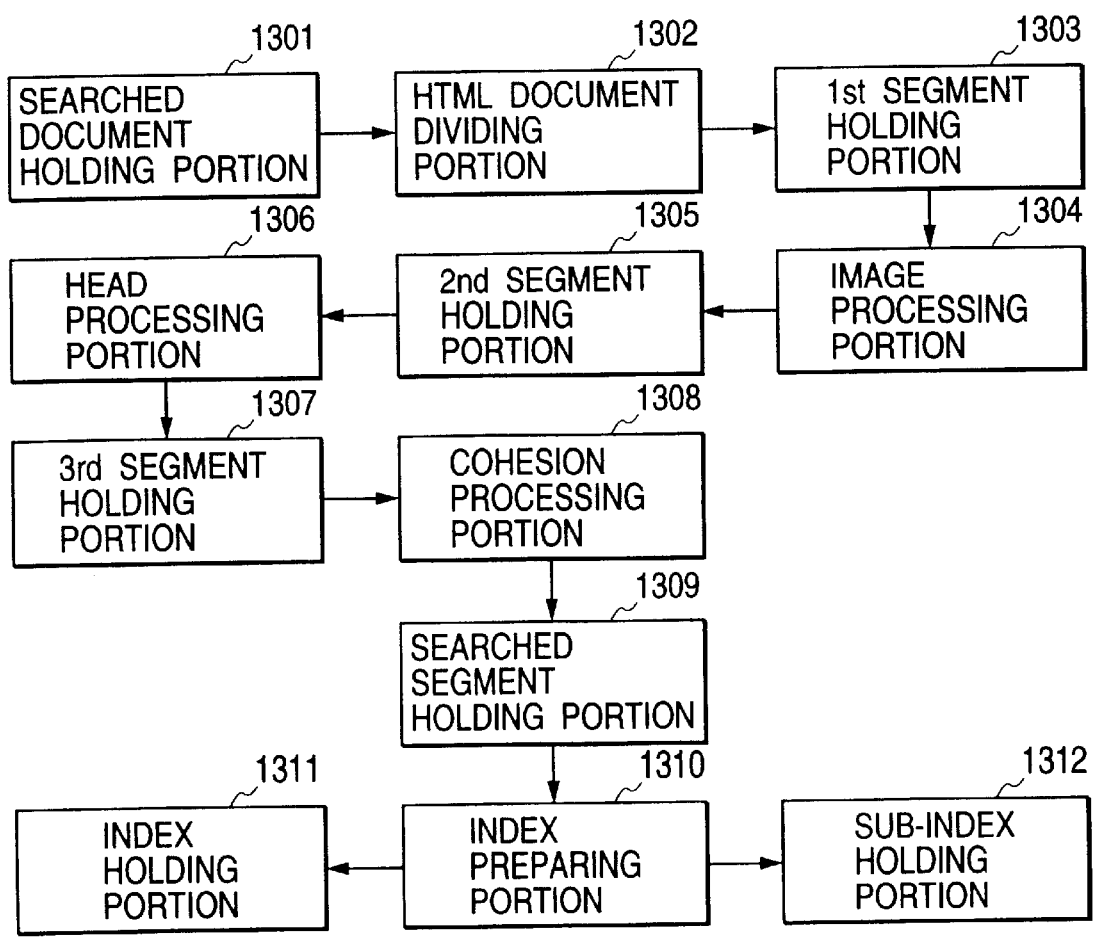
FIG. 13 is a block diagram showing the basic configuration of a third embodiment of the present invention.

FIG. 13 is a block diagram showing the basic functional configuration of an apparatus for executing the searched segment generation and index preparation.

Referring to FIG. 13, there are shown a searched document holding portion 1301 for holding a searched document; an HTML document dividing portion 1302 for dividing the searched document held in the searched document holding portion 1302, according to HTML tags; a first segment holding portion 1303 for holding segments generated by the HTML document dividing portion 1302; and an image processing portion 1304 for calculating the level of association of segments, among those held in the first segment holding portion 1303, adjacent to an image, thereby generating a second segment.

There are also shown a second segment holding portion 1305 for holding the segments generated by the image processing portion 1304; a header processing portion 1306 for executing a header process on the segments held by the second segment holding portion 1305 thereby generating a third segment; a third segment holding portion 1307 for holding the segment by the header processing portion 1306; a cohesion process portion 1308 for dividing among those held by the third segment holding portion 1307, those having size exceeding a predetermined threshold value according to the state of appearance of words; and a searched segment holding portion 1309 for holding the segments generated by the cohesion processing portion 1308.

There are further shown an index preparing portion 1310 for preparing an index for achieving high-speed search on the searched segment held in the searched segment holding portion 1309; an index holding portion 1311 for holding the index prepared by the index preparing portion 1310, for the TEXT of the searched segment held in the searched segment holding portion 1309; and an index holding portion 1312 for holding the sub index prepared by the index preparing portion 1310, for the INFO of the searched segment held in the searched segment holding portion 1309.

The index held in the index holding portion 1311 and the sub index held in the sub index holding portio 1312 are transferred to and subjected to search in another apparatus, through a communication channel or by a portable memory medium.

Fourth Embodiment (Search Apparatus)

Figure 14:
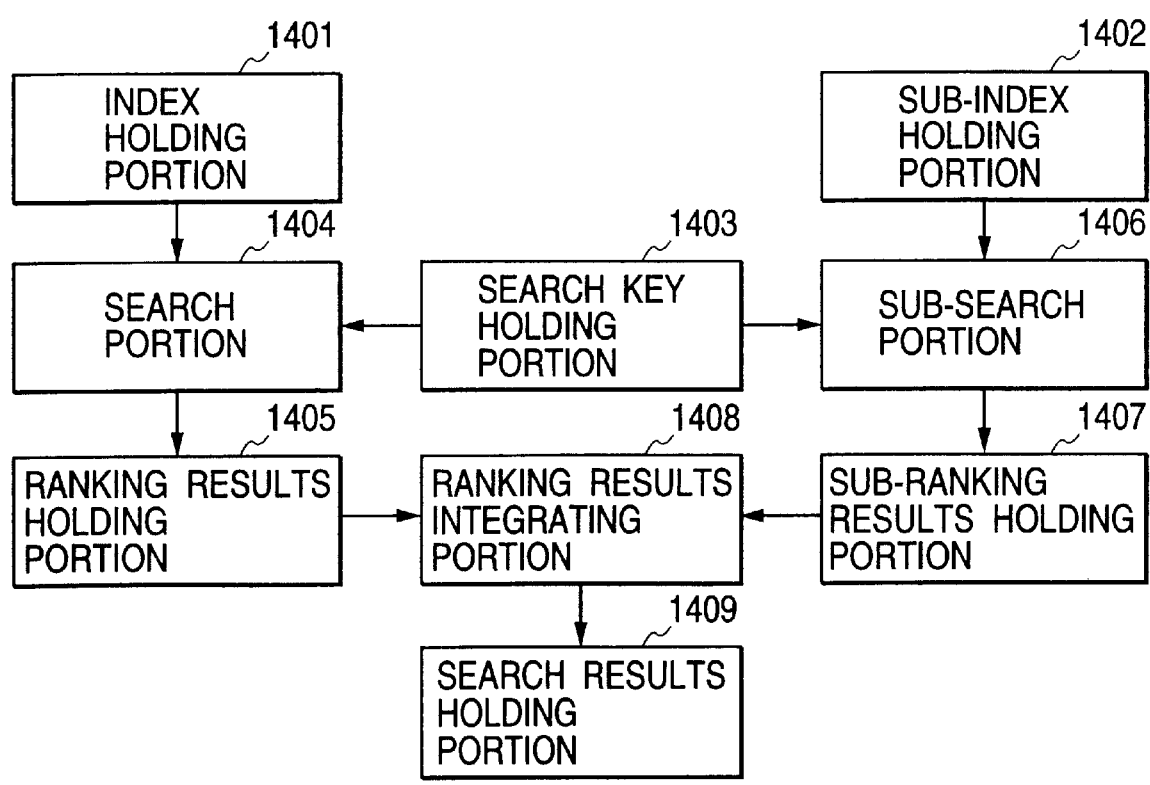
FIG. 14 is a block diagram showing the basic configuration of a fourth embodiment of the present invention.

FIG. 14 is a block diagram showing the basic functional configuration of a search apparatus for effecting search with the index and the sub index supplied to the apparatus described in the third embodiment.

In FIG. 14, there are shown an index holding portion 1401 for holding the index prepared by the apparatus shown in FIG. 12 or 13; a sub index holding portion 1402 for holding the sub index prepared by the apparatus shown in FIG. 12 or 13; and a search key holding portion 1403 for holding a character train to be used for search.

There are also shown a search portion 1404 for searching, utilizing the index held in the index holding portion 1401, a character train coinciding with the search character trains held in the search key holding portio 1403; a ranking result holding portion 1405 for holding the ranking result generated by the search portion 1404; a sub search portion 1406 for searching, utilizing the sub index held in the sub index holding portion 1402, a character train coinciding with the search character trains held in the search key holding portion 1403; a sub ranking result holding portion 1407 for holding the sub ranking result generated by the sub search portion 1406; a ranking result integrating portion 1408 for integrating the ranking result held in the ranking result holding portion 1405 and the sub ranking result held in the sub ranking result holding portion 1405 thereby preparing the search result; and a search result holding portion 1409 for holding the search result prepared by the ranking result integrating portion 1408.

The index and the sub index prepared in the processes of the foregoing embodiments are supplied to and held in the index holding portion 1401 and the sub index holding portion 1402 for example through a communication channel or by a portable memory medium.

In the foregoing embodiments, the segments are generated in succession by the HTML document dividing means, image processing means, header process means and cohesion processing means, but such configuration is not restrictive and the apparatus may be so constructed as to generate the segments for example by the HTML dividing means only.

Also the apparatus may be so constructed as to generate the segments by the HTML document dividing means and the image processing means.

Also the apparatus may be so constructed as to generate the segments by the HTML document dividing means and the header processing means.

Also the apparatus may be so constructed as to generate the segments by the HTML document dividing means and the cohesion processing means.

Also the apparatus may be so constructed as to generate the segments by the HTML document dividing means, the image processing means and the header processing means.

Also the apparatus may be so constructed as to generate the segments by the HTML document dividing means, the image processing means and the cohesion processing means.

Also the apparatus may be so constructed as to generate the segments by the HTML document dividing means, the header processing means and the cohesion processing means.

In the foregoing embodiments, the HTML document is divided in the positions shown in FIG. 2, but such division is not restrictive and may be defined in other positions. Also the dividing positions may be rendered arbitrarily variable.

In the foregoing embodiments, the level of association of a segment adjacent to an image is determined according to the rule shown in FIG. 5, but such rule is not restrictive and the level of association may be defined with another rule.

Further, the rule of the level of association may be rendered arbitrarily definable.

In the foregoing embodiments, the level of association of a segment adjacent to an image is determined according to the image position and the presence/absence of the line change or paragraph change in the proceeding and succeeding rows, but such determination is not restrictive and the level of association may be determined by other factors.

Also in the foregoing embodiments, a word is extracted by the form element analysis, but such form is not restrictive and a word may be defined by a character train extracted by a change in the font.

Furthermore, in the foregoing embodiments, the vocabulary cohesion is calculated from same words appearing in two sentences, but such form is not restrictive and the vocabulary cohesion may be calculated on an existing knowledge database, utilizing also words of same and similar meaning, words of upper and lower categories etc. For example, with the numbers $x1, x2, x3, x4, x5$ and weights $w1, w2, w3, w4, w5$ respectively of the same word, word of same and similar meaning and word of upper and lower categories, the vocabulary cohesion can be defined as:

$$W(u, v) = \exp\{\lambda(w1x1 + w2x2 + w3x3 + w4x4 + w5x5)\}$$

In the foregoing embodiments, the vocabulary adhesion is determined by a logarithmic function, but such definition is not restrictive and there may be adopted another non-monotonously increasing function.

Also in the foregoing embodiments, the evaluation function is defined by an equation including the vocabulary cohesion between the sentences and the length factor of the paragraph, but such definition is not restrictive and another equation may be adopted as the evaluation function.

Also in the foregoing embodiments, a large-sized segment is divided by a method of determining the cohesion between the sentences by the appearing words thereby determining the paragraph, but such method is not restrictive and the division may be made by other methods, such as determining the paragraph from the distribution of the words appearing in the entire TEXT of the segment.

Also in the foregoing embodiments, the indexes are prepared separately for the TEXT and the INFO of the segment and the search result by the index of the TEXT is added to that by the index of the INFO, but such method is not restitutive and there may be adopted a method of mixing the two to obtain a single index which is used for obtaining the search result.

Also the index for the INFO may be omitted and the TEXT alone may be subjected to search.

Furthermore, in the foregoing embodiments, the HTML document dividing portion generates the first segments after eliminating the portions not subjected to search such as the comment or the meta tag, but such method is not restrictive and the first segments may be generated utilizing the information of the comment and the meta tag.

Also in the foregoing embodiments, the HTML document is regarded as the object of processing and the segments are generated utilizing the HTML structure, but such method is not restrictive and the apparatus may also be so constructed as to process the document of other structures such as SCML or XML and to generate the segments, utilizing such structural information.

Also in the foregoing embodiments, the first segment holding portion 103, second segment holding portion 105, third segment holding portion 107, index holding portion 111, sub index holding portion 112, search key holding portion 113, ranking result holding portion 115, sub ranking result holding portion 117 and search result holding portion 119 are constituted by a RAM while the searched document holding portion 101 and searched segment holding portion 109 are constituted by a disk device, but such configuration is not restrictive and there may be adopted arbitrary memory media.

Also in the foregoing embodiments, the component portions are constituted on a same computer, but such configuration is not restrictive and the portions may be provided on computers or processing apparatus dispersed on a network.

Also in the foregoing embodiments, the program is stored in a ROM, but such configuration is not restrictive and there may be employed an arbitrary memory medium or a circuit performing similar functions.

The present invention may be applied to a system consisting of plural equipment or an apparatus consisting of a single equipment. Also the present invention includes a case where the program codes of a software realizing the functions of the aforementioned embodiments are supplied to a system or an apparatus and the functions of the aforementioned embodiments are realized by reading and execution of the program codes stored in the memory medium by a computer (or CPU or MPU) of the above-mentioned system or apparatus. In such case the program codes themselves of the software realize the functions of the aforementioned embodiments, and the memory medium storing the program codes constitutes the present invention.

The memory medium (storage medium) storing such program codes can be, for example, a floppy disk, a hard disk, an optical disk, a magnetooptical disk, a CD-ROM, a CD-R, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

As explained in the foregoing, the present invention provides an effect of realizing text search providing, as the result of search, a document portion matching the search condition.

Fifth Embodiment

Figure 15:
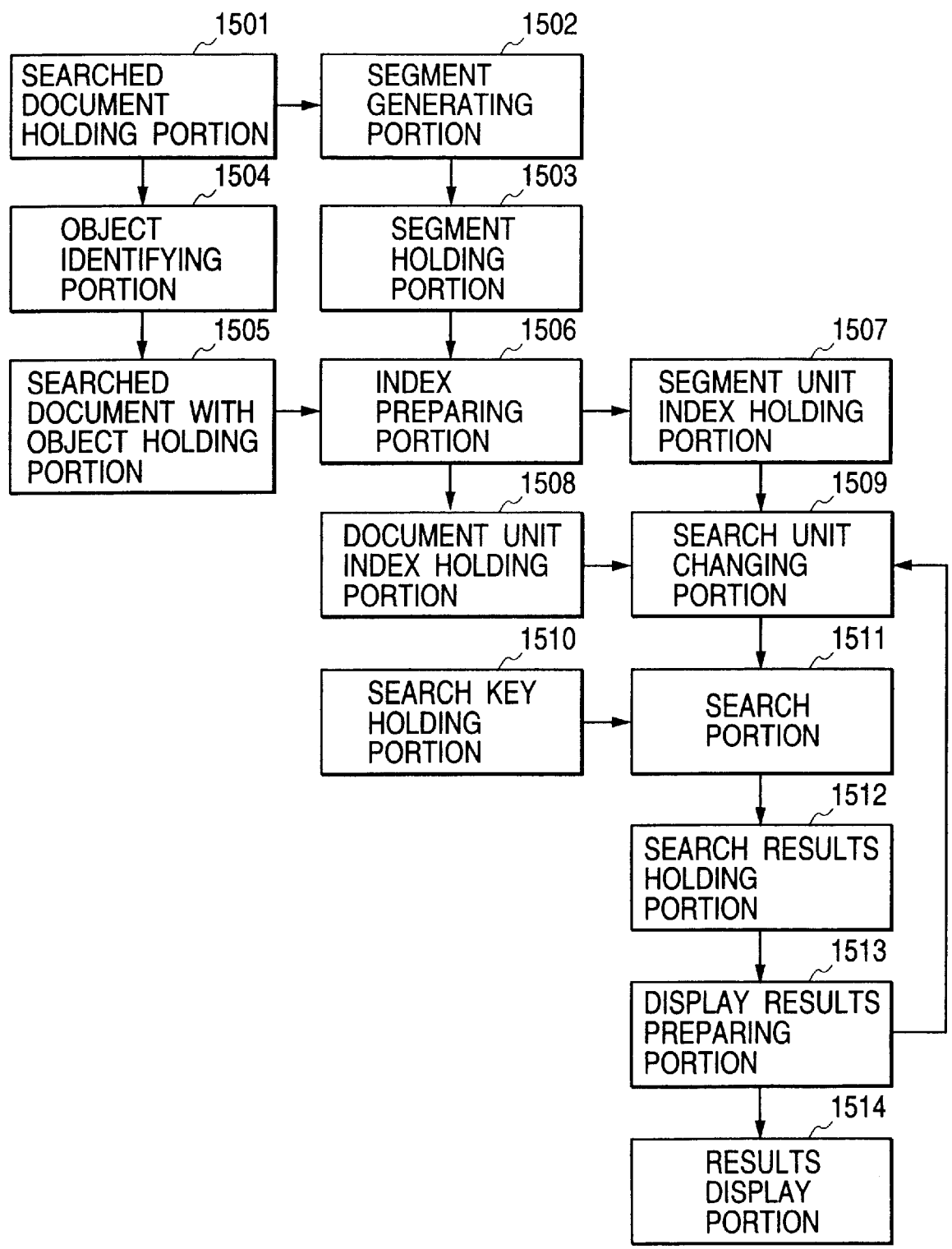
FIG. 15 is a block diagram showing the functional configuration of a text search apparatus constituting a fifth embodiment of the present invention.

FIG. 15 is a block diagram showing the functional configuration of a text search apparatus constituting a fifth embodiment of the present invention, wherein provided are a searched document holding portion 1501; a segment generating unit 1502; a segment holding portion 1503; an object identifying portion 1504; a searched document with object holding portion 1505; an index preparing portion 1506; a segment unit index holding portion 1507; a document unit index holding portion 1508; a search unit changing portion 1509; a search key holding portion 1510; a search unit 1511; a search result holding portion 1512; a display result generating portion 1513; and a result displaying portion 1514.

The functions of these portions will be explained in the following. The searched document holding portion 1501 holds the searched document. The segment generating portion 1502 divides the searched document, held in the searched document holding portion 1501, into segments according to the content. In case the object of search is an HTML (hyper text markup language description) document, the segments are generated by judging the partition in layout from the HTML tag, or by identifying the position where the subject is changed from the transition in the appearing language. The segment holding portion 1503 holds the segment generating portion 1502.

The object identifying portion 1504 identifies the object of the searched document held in the searched document holding portion 1501. The object means an information object described in the searched document. There is discriminated the object to which the document is related, based on the frequency of the presence of the object name, the file name, and the URL (uniform resource locator: WWW server address) in case of a web page. The searched document with object holding portion 1505 holds the object, identified by the object identifying portion 1504, together with the searched document.

The index preparing portion 1506 prepares the searching index from the segment held in the segment holding portion 1503 and the searched document with object held in the searched document with object holding portion 1505. The index prepared from the searched document with object contains additional information indicating the information of the object to which each document belongs. The segment unit index holding portion 1507 holds the searching index prepared by the index preparing portion 1506. The document unit index holding portion 1508 holds the searching index prepared by the index preparing portion 1506 from the searched document with object, held in the searched document with object holding portion 1505.

The search unit changing portion 1509 transfer either appropriate one of the segment unit index held in the segment unit index holding portion 1507 and the document unit index held in the document unit index holding portion 1508, based on the information from the display result generating portion 1513, as the index of the search object to the search unit 1511. For the first time, the segment unit index is transferred, and, if information indicating that the number of search results obtained by such segment unit index exceeds the threshold value is transferred from the display result generating portion 1513, the search unit changing unit 1509 transfers the document unit index as the search object. The search key holding portion 1510 holds a character train for executing the search. The search unit 1511 searches a character train coinciding with the searching character train held in the search key holding portion 1510, utilizing the index selected as the search object by the search unit changing portion 1509. The search result holding portion 1512 holds the search result generated by the search unit 1511.

The display result generating portion 1513 checks the number of the search result held in the search result holding portion 1512, thereby asking the search unit changing portion 1509 to change the search unit or generating the search result to be displayed. In case the number of the search result of the index in the segment unit exceeds a certain threshold value, an instruction is given to the search unit changing unit 1509 for changing to the index of the document unit, but, if the threshold value is not exceeded, the search result in the segment unit is made the result to be displayed or presented. In case the number of the search result of the index in the document exceeds a certain threshold value, the result for display is prepared by collecting the search result for each object, but, if the threshold value is not exceeded, the search result in the document unit is made the result to be displayed or presented. The result display portion 1514 displays the result generated by the display result generating portion 1513.

Figure 16:
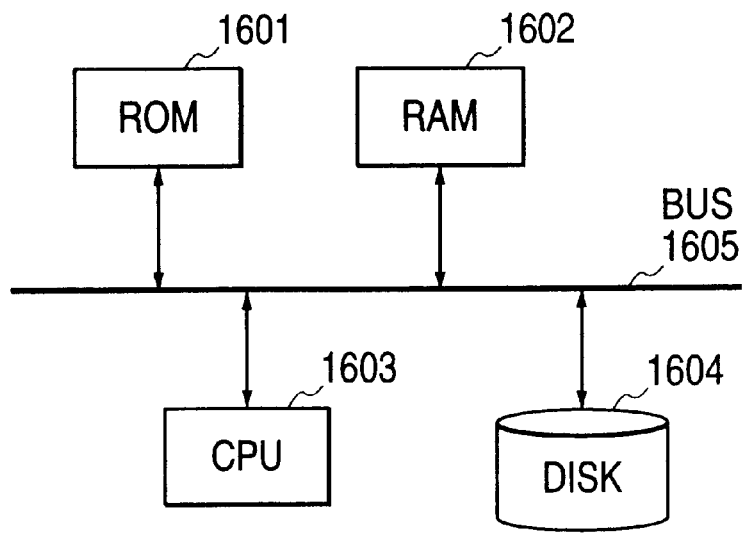
FIG. 16 is a block diagram showing the hardware configuration of the text search apparatus constituting the fifth embodiment of the present invention.

FIG. 16 is a block diagram showing the hardware configuration of the text search apparatus of the fifth embodiment of the present invention, wherein provided are a ROM 1601; a RAM 1602; a central processing unit 1603; a disk device 1604; and a bus 1605.

The ROM 1601 stores a program for realizing a control sequence to be explained later. The RAM 1602 provides memory areas, required by the search key holding portion 1501 and the search result holding portion 1512, and required for the execution of the above-mentioned program. The central processing unit 1603 executes processes according to the program held in the ROM 1601. The disk device 1604 constitutes the searched document holding portion 1501, segment holding portion 1503, searched document with object holding portion 1505, segment unit index holding portion 1507 and document unit index holding portion 1508 described above. The bus 1605 connects the ROM 1601, RAM 1602, central processing unit 1603 and disk device 1604, and enables data exchange among these components.

Figure 22:
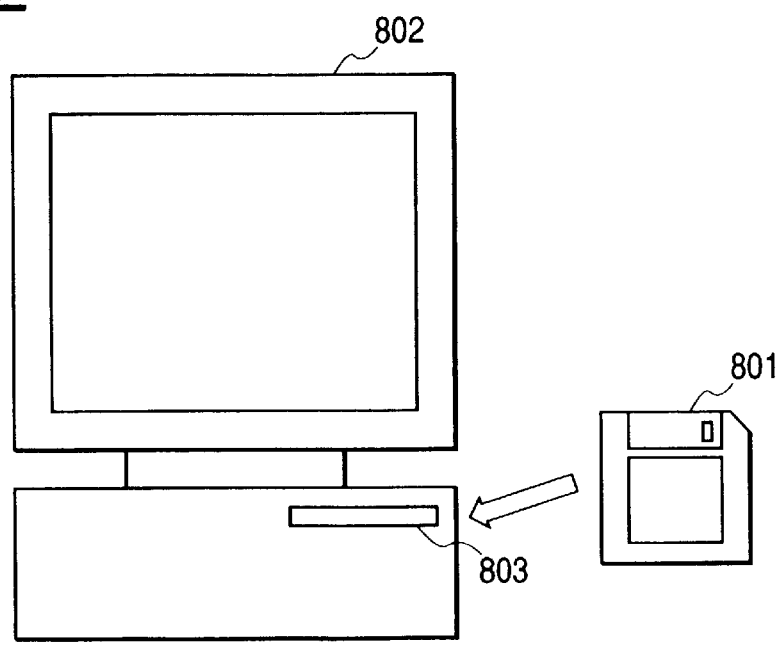
FIG. 22 is a schematic view showing an example of the concept of supply of the program of the present invention and the related data from the memory medium to the apparatus.

FIG. 22 is a schematic view showing the concept of supply of the program and related data of the present invention from the memory medium to the apparatus. The program and related data of the present invention are supplied by inserting a memory medium 801 such as a floppy disk or a CD-ROM to a slop 803 provided in a drive device 802. Thereafter the program and related data of the present invention can be executed by installing such program and data from the memory medium 801 once to a hard disk and then to the RAM, or directly to the RAM without installation in the hard disk.

Figure 21:
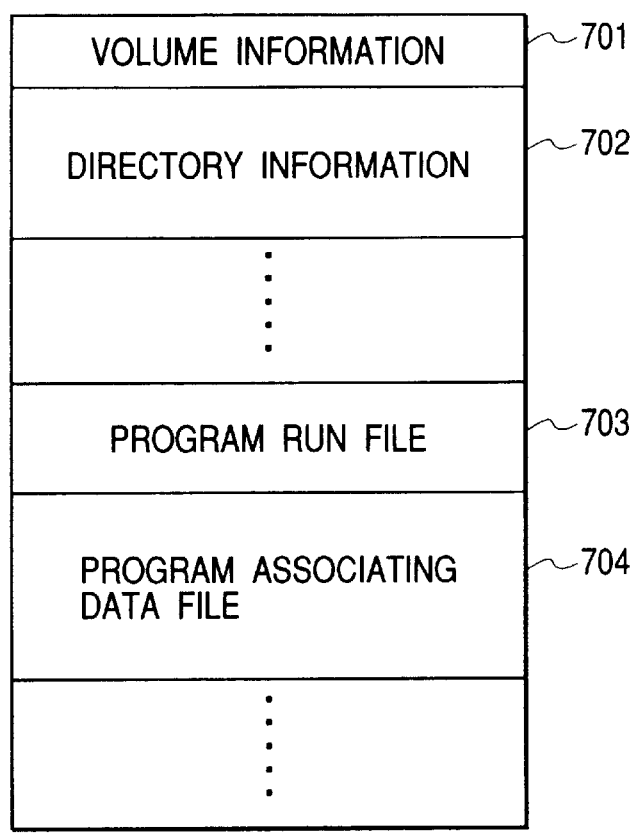
FIG. 21 is a schematic view showing an example of the configuration of the memory content of a memory medium storing the program of the present invention and the related data.

FIG. 21 is a schematic view showing an example of the configuration of the content of the memory medium, storing the program and related data of the present invention. The memory medium of the present invention contains, for example, volume information 701; directly information 702; a program execution file 703; and a program related data file 704. The program of the present invention is composed of program codes formed according to flow charts shown in FIGS. 17 and 18 and explained later.

Figure 17:
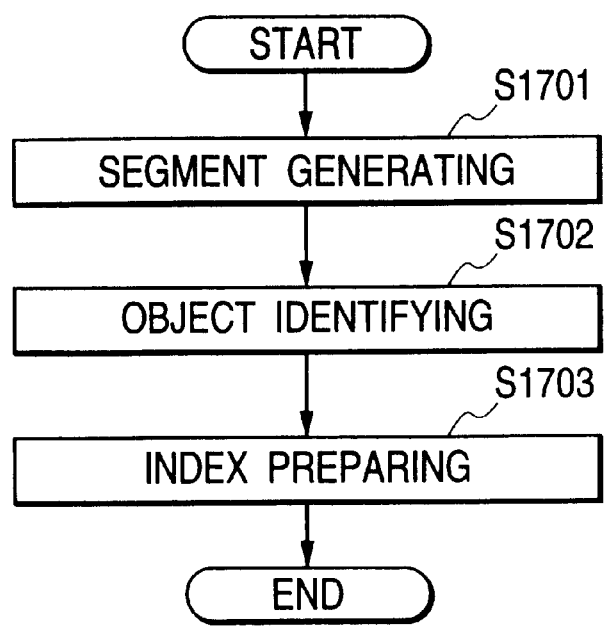
FIG. 17 is a flow chart outlining the index preparing phase of the fifth embodiment of the present invention.
Figure 18:
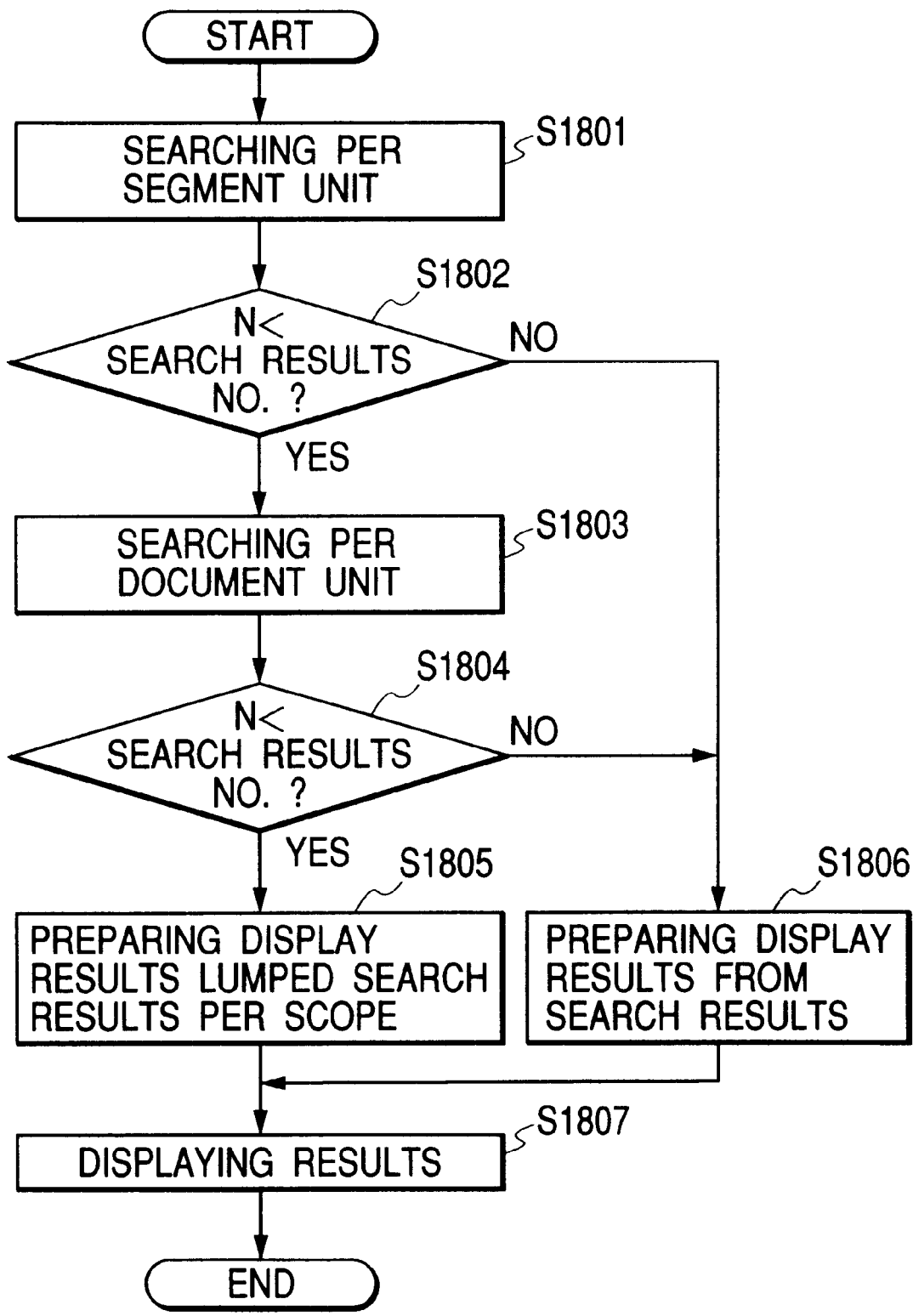
FIG. 18 is a flow chart outlining the searching phase of the fifth embodiment of the present invention.

In the following there will be explained the function of the text search apparatus constituting the fifth embodiment of the present invention and constructed as explained in the foregoing, with reference to FIGS. 15, 17 and 18. The process of the fifth embodiment of the present invention is roughly divided into an index preparation phase and a search phase. In the following there will be explained the processes of the index preparation phase and the search phase, in the text search apparatus of the fifth embodiment of the present invention.

[Index Preparation Phase (FIG. 17)]

A step S1701 divides the searched document held in the searched document holding portion 1501 according to the content, thereby generating segments. Then a step S1702 identifies the object of the searched document held in the searched document holding portion 1501. A step S1703 prepares the searching index from the segments held in the segment holding portion 1503 and the searched document with object held in the searched document with object holding portion 1505.

The index preparation phase is thus terminated.

[Search Phase (FIG. 18)]

In a step S1801, the search portion 1511 executes search in the segment unit, utilizing the segment unit index held in the segment unit index holding portion 1507. Then, in a step S1802, the display result generating portion 1513 discriminates whether the number of the search result in the segment unit is larger than a threshold value N, and, if larger, the sequence proceeds to a step S1803, but, if not, the sequence proceeds to a step S1806.

In a step S1803, the search portion 1511 executes search in the document unit, utilizing the document unit index held in the document unit index holding portion 1508. Then, in a step S1804, the display result generating portion 1513 discriminates whether the number of the search result in the document unit is larger than the threshold value N, and, if larger, the sequence proceeds to a step S1805, but, if not, it proceeds to a step S1806.

In a step S1805, the display result generating portion 1513 prepares the display result by collecting the search results for each object, and the sequence then proceeds to a step S1807. In a step S1806, the display result generating portion 1513 presents the search result as the display result, and the sequence then proceeds to a step S1807. In a step S1807, the result display portion 1514 displays the display result generated by the display result generating portion 1513, whereupon the search phase is terminated.

As explained in the foregoing, the fifth embodiment of the present invention provides an effect of realizing a text search apparatus capable of automatically switching plural search units, by starting from the search with a fine unit and increasing the search unit according to the number of the search result.

Sixth Embodiment

In the foregoing fifth embodiment, the index preparation phase and the search phase are executed within a same apparatus, but such configuration is not restrictive and there may be provided an apparatus for executing the index preparation phase only. In the sixth embodiment of the present invention, there will be explained an apparatus executing the above-described index preparation phase only.

Figure 19:
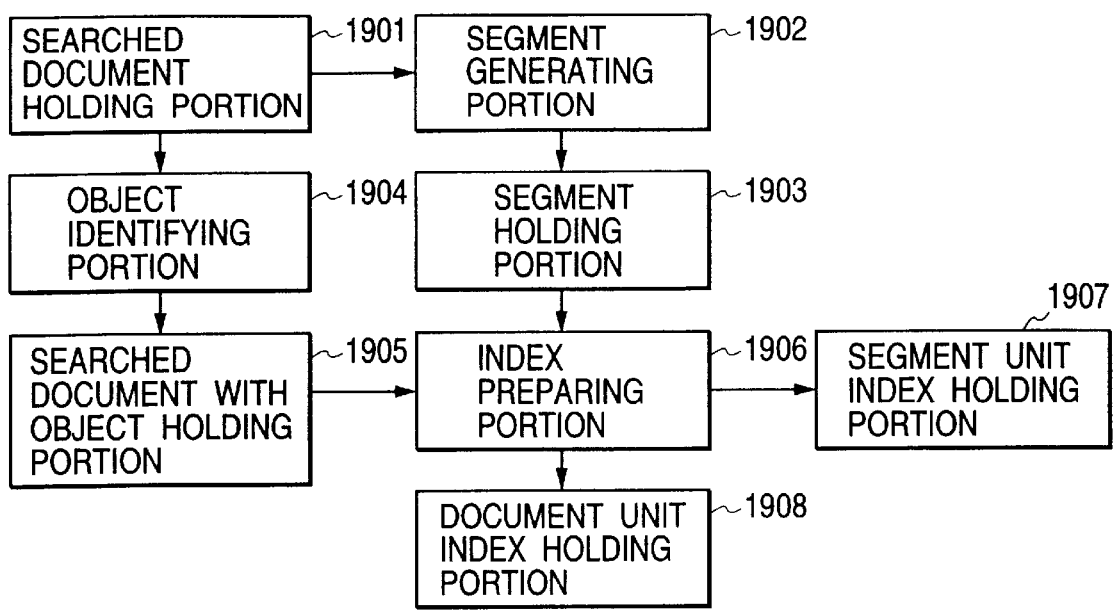
FIG. 19 is a block diagram showing the functional configuration of an index preparation apparatus constituting a sixth embodiment of the present invention.

FIG. 19 is a block diagram showing the functional configuration of an index preparation apparatus constituting the sixth embodiment of the present invention, wherein provided are a searched document holding portion 1901; a segment generating portion 1902; a segment holding portion 1903; an object identifying portion 1904; a searched document with object holding portion 1905; an index preparing portion 1906; a segment unit index holding portion 1907; and a document unit index holding portion 1908.

The searched document holding portion 1901 holds the searched document. The segment generating portion 1902 divides the searched document, held in the searched document holding portion 1901, according to the content. The segment holding portion 1903 holds the segments generated by the segment generating portion 1902. The object identifying portion 1904 identifies the object of the searched document held in the searched document holding portion 1901. The searched document with object holding portion 1905 hold the object, identified by the object identifying portion 1904, together with the searched document.

The index preparing portion 1906 prepares the searching index from the segment held in the segment holding portion 1903 and the searched document with object, held in the searched document with object holding portion 1905. The segment unit index holding portion 1907 holds the searching index, prepared by the index preparing portion 1906 from the segment held in the segment holding portion 1903. The document unit index holding portion 1908 holds the searching index prepared by the index preparing portion 1906 from the searched document with object, held in the searched document with object holding portion 1905.

In the present index preparation apparatus, the segment unit index held in the segment unit index holding portion 1907 and the document unit index held in the document unit index holding portion 1908 are provided to and utilized in another apparatus (text search apparatus) through a communication channel or a portable recording medium.

As explained in the foregoing, the sixth embodiment of the present invention provides an effect of automatically switching plural search units in an external apparatus (another text search apparatus), by preparing the segment unit index and the document unit index necessary for text search, and supplying the external apparatus (another text search apparatus) with such segment unit index and document unit index.

Seventh Embodiment

In a seventh embodiment of the present invention, there will be explained a search apparatus utilizing the indexes prepared by the index preparation apparatus in the above-described sixth embodiment of the present invention.

Figure 20:
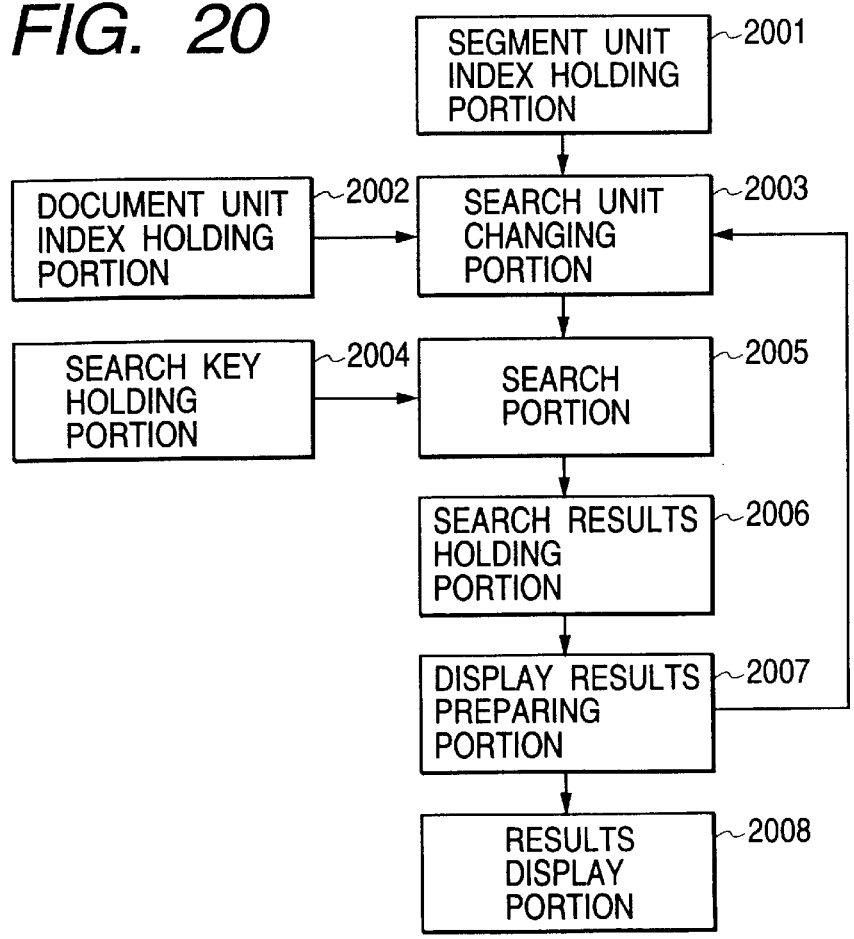
FIG. 20 is a block diagram showing the functional configuration of an index preparation apparatus constituting a seventh embodiment of the present invention.

FIG. 20 is a block diagram showing the functional configuration of a text search apparatus constituting the seventh embodiment of the present invention, wherein provided are a segment unit index holding portion 2001; a document unit index holding portion 2002; a search unit changing unit 2003; a search key holding portion 2004; a search unit 2005; a search result holding portion 2006; a display result generating portion 2007; and a result display portion 2008.

The segment unit index holding portion 2001 holds the segment unit index prepared by the index preparation apparatus of the foregoing sixth embodiment shown in FIG. 19. The document unit index holding portion 2002 holds the document unit index prepared by the index preparation apparatus of the foregoing sixth embodiment shown in FIG. 19. The search unit changing portion 2003 provides the search portion 2005 with appropriate one of the segment unit index held in the segment unit index holding portion 2001 and the document unit index held in the document unit index holding portion 2002 as the index of the search object. The search key holding portion 2004 holds a character train for executing the search.

The search portion 2005 searches a character train coinciding with the searching character train held in the search key holding portion 2004, utilizing the index selected as the search object by the search unit changing portion 2003. The search result holding portion 2006 holds the search result generated by the search portion 2005. The display result generating portion 2007 checks the number of the search result held in the search result holding portion 2006, thereby asking the search unit changing portion 2003 to change the search unit or generating the search result to be displayed. The result display portion 2008 displays the result generated by the display result generating portion 2007.

As explained in the foregoing, the seventh embodiment of the present invention provides an effect of realizing a text search apparatus capable of automatically switching plural search units, by starting from the search with a fine unit and increasing the search unit according to the number of the search result.

In addition to the foregoing fifth to seventh embodiments of the present invention, there can be conceived following other embodiments (modifications).

(1) In the above-mentioned embodiments, a same threshold value N is assumed for the number of result of the segment unit search and that of the document unit search, but such configuration is not restrictive and there may be adopted different threshold values.

(2) In the above-mentioned embodiments, either the index of the segment unit and that of the document unit is selectively used, but such configuration is not restrictive and indexes of various units may be prepared and selected by switching.

(3) In the above-mentioned embodiments, the object of the document only is identified and used for generating the display information, but such configuration is not restrictive and it is also possible to identify also the object of the segment and to generate the display information utilizing such object, according to the number of search result in the segment unit.

(4) In the above-mentioned embodiments, the object of the document is identified in advance and is utilized in generating the display information in case the number of the search result in the document unit exceeds the threshold value, but such configuration is not restrictive and the search may simply be executed by switching the indexes, without identifying the object.

(5) In the above-mentioned embodiments, the search unit is assumed to be always determined automatically, but such configuration is not restrictive and there may be added a function of executing the search with a search unit designated by the user.

(6) In the above-mentioned embodiments, the search key holding portion 1510 (2004) and the search result holding portion 1512 (2006) are constituted by a RAM while the searched document holding portion 1501 (1901), the segment holding portion 1503 (1903), the searched document with object holding portion 1505 (1905), the segment unit index holding portion 1507 (1907, 2001), and the document unit index holding portion 1508 (1908, 2002) are realized by a disk device, but such configuration is not restrictive and there may be employed arbitrary memory media.

(7) In the above-mentioned embodiments, the components are constituted on a same computer, but such configuration is not restrictive and they may be constituted by computers or processing apparatus dispersed on a network.

(8) In the above-mentioned embodiments, the program is stored in a ROM, but such configuration is not restrictive and there may be employed an arbitrary memory medium or a circuit performing similar functions.

(9) In the above-mentioned embodiments, the result is displayed by the result presenting portion 1514 (2008), but such configuration is not restrictive and the result may be printed in the result presenting portion 1514 (2008). In such a case, a printer may be added to the configuration shown in FIG. 16.

The present invention may be applied to a system consisting of plural equipment or an apparatus consisting of a single equipment. Also the present invention includes a case where the program codes of a software realizing the functions of the aforementioned embodiments are supplied to a system or an apparatus and the functions of the aforementioned embodiments are realized by reading and execution of the program codes stored in the memory medium by a computer (or CPU or MPU) of the above-mentioned system or apparatus. In such case the program codes themselves of the software realize the functions of the aforementioned embodiments, and the memory medium storing the program codes constitutes the present invention.

The memory medium (storage medium) storing such program codes can be, for example, a floppy disk, a hard disk, an optical disk, a magnetooptical disk, a CD-ROM, a CD-R, a magnetic tape, a non-volatile memory card or a ROM.

The present invention also includes not only a case where the functions of the aforementioned embodiments are realized by the execution of the read program codes by the computer but also a case where an operating system or the like functioning on the computer executes all or a part of the actual processes under the control of such program codes thereby realizing the functions of the aforementioned embodiments.

The present invention further includes a case wherein the program codes read from the memory medium are once stored in a memory provided in a function expansion board inserted into the computer or a function expansion unit connected to the computer, and CPU provided in the function expansion board or the function expansion unit executes all the process or a part thereof according to the instructions of such program codes, thereby realizing the functions of the aforementioned embodiments.

As explained in the foregoing, the present invention provides an effect of realizing a text search capable of automatically switching plural search units, by selecting an appropriate one of the segment unit index and the document unit index, searching a character train coinciding with the searching character train based on the selected index, and, for presenting the search result, starting from the search with a fine unit and increasing the search unit according to the number of the search result.

Also as explained in the foregoing, the present invention provides an effect of automatically switching plural search units in an external apparatus (another text search apparatus), by preparing the segment unit index and the document unit index required for document search, and supplying the external apparatus (another text search apparatus) with such segment unit index and document unit index.

Also as explained in the foregoing, the present invention provides an effect of realizing document search capable of automatically selecting plural search units, by selecting an appropriate one of the segment unit index and the document unit index, searching a character train coinciding with the searching character train based on the selected index, and, for presenting the search result, starting from the search with a fine unit and increasing the search unit according to the number of the search result.

Also as explained in the foregoing, the present invention provides an effect of automatically switching plural search units in an external apparatus (another text search apparatus), by executing an index preparing method in the index preparation apparatus thereby preparing the segment unit index and the document unit index required for document search, and supplying the external apparatus (another text search apparatus) with such segment unit index and document unit index.

Also as explained in the foregoing, the present invention provides an effect of realizing document search capable of automatically selecting plural search units, by reading a document search method from a memory medium and executing such method by a document search apparatus thereby selecting an appropriate one of the segment unit index and the document unit index, searching a character train coinciding with the searching character train based on the selected index, and, for presenting the search result, starting from the search with a fine unit and increasing the search unit according to the number of the search result.

Also as explained in the foregoing, the present invention provides an effect of automatically switching plural search units in an external apparatus (another text search apparatus), by reading an index preparation method from a memory medium, executing such method in the index preparation apparatus thereby preparing the segment unit index and the document unit index required for document search, and supplying the external apparatus (another text search apparatus) with such segment unit index and document unit index.

Eighth Embodiment

Figure 23:
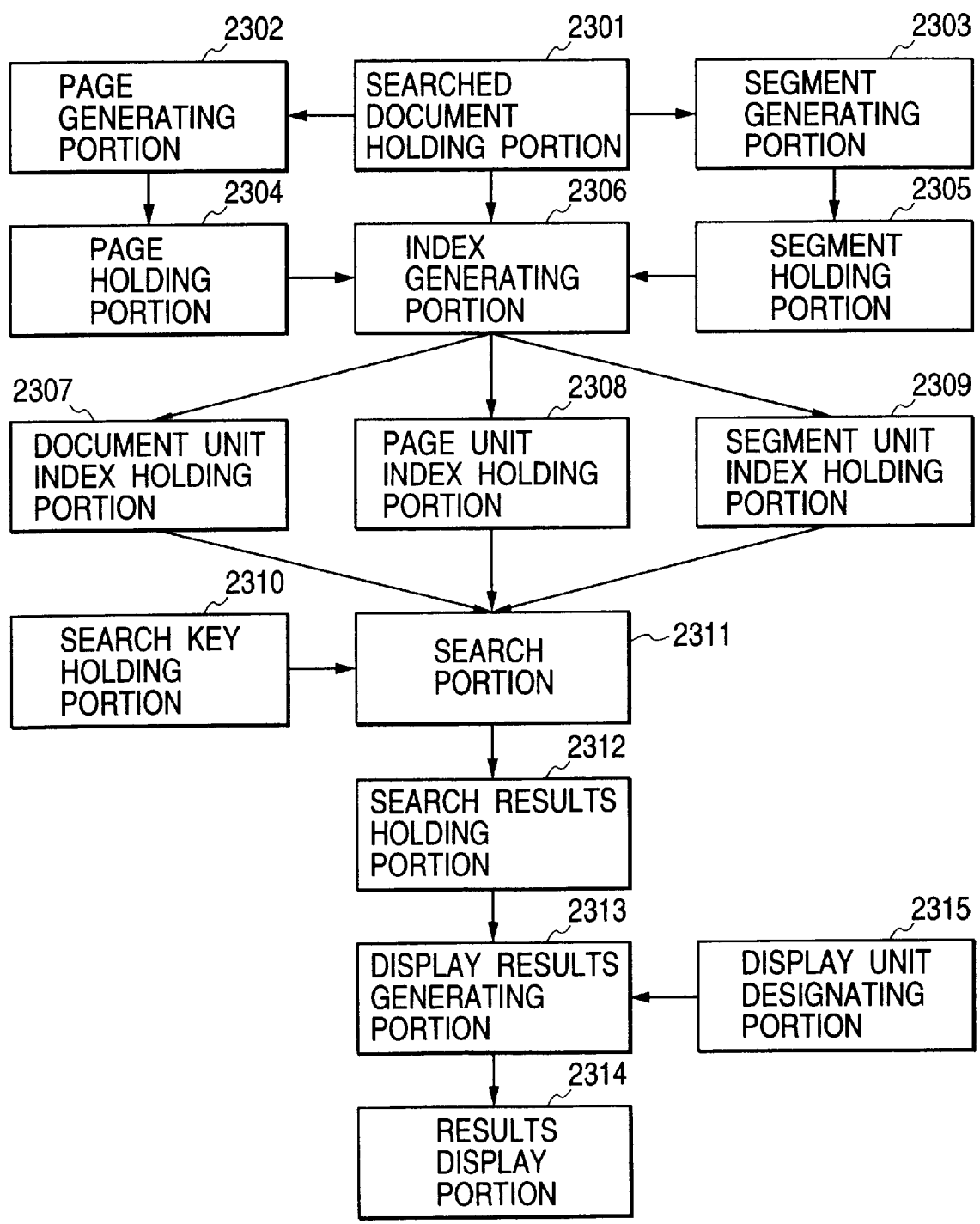
FIG. 23 is a block diagram showing the configuration of a text search apparatus of the present invention.

FIG. 23 is a block diagram showing the configuration of a text search apparatus of the present invention.

As shown in FIG. 23, the text search apparatus is provided with a search document holding portion 2301 for holding a searched document; a page generating portion 2302 for dividing the searched document held in the searched document holding portion 2301 in the page unit according to the content thereby generating pages constituting the search object; a page holding portion 2304 for holding the pages generated in the page generating portion 2302; a segment generating portion 2303 for dividing the searched document in the segment unit according to the content thereby generating segments constituting the search object; and a segment holding portion 2305 for holding the segments generated in the segment generating portion 2303. If the searched document is for example an HTML document, an HTML document file among a group of the plural HTML documents constituting a specified subject, is generated as a page. Also the segments are generated by judging the partitions in the layout from the HTML tag, or identifying a position of change of the subject from the transition of the appearing words.

The search objects constituted by the searched document held in the searched document holding portion 2301, the pages held in the page holding portion 2304 and the segments held in the segment holding portion 2305 are entered into an index preparing portion 2306, which generates searches indexes consisting of a document unit index, a page unit index and a segment unit index representing the respective search objects. The prepared document unit index is held in the index holding portion 2307 together with the searched document, while the page unit index is held in the page unit index holding portion 2308 together with the page of the search object, and the segment unit index is held in the segment unit index holding portion 2309 together with the segment of the search object.

The search objects held in the document unit index holding portion 2307, the page unit index holding portion 2308 and the segment unit index holding portion 2309 are entered into a search portion 2311, which executes the search of the searching character train held in the search key holding portion 2110 for each search object represented by the respective search index. The search result, obtained in this search for each search object represented by the respectively search index, is held in a search result holding portion 2312.

The search results held in the search result holding portion 2312 are supplied to a display result generating portion 2313, which generates display information representing the search result of the search object corresponding to the display unit designated by a display unit designating unit 2315 and the information indicating such display unit, and also generates display unit menu image information for switching the display unit. A display unit designating portion 2315 is provided with operation means such as a key or a mouse for designating a document unit, a page unit or a segment unit as the display unit for the search result, and the display unit can be designated on the display unit menu image by the operation with the operation means. The display information generated by the display result generating portion 2313 is entered into a result display portion 2314, which displays the search result of the search object corresponding to the designated display unit and information indicating the display unit, and also displays a display unit menu image based on the display unit menu image information. Also, in the course of display of the search result in the designated display unit, if another display unit, different from the designated display unit, is designated on the display unit menu image, the display result generating portion 2313 generates display information representing the search result of the search object corresponding to such another display unit and the information on such display unit, in order for switching to the display of the search result of the search object corresponding to such another display unit, and thus generated display information is displayed on the result display portion 2314.

In the following there will be explained the hardware configuration of the present text search apparatus, with reference to FIG. 24, which is a block diagram showing the hardware configuration of the text search apparatus shown in FIG. 23.

Figure 24:
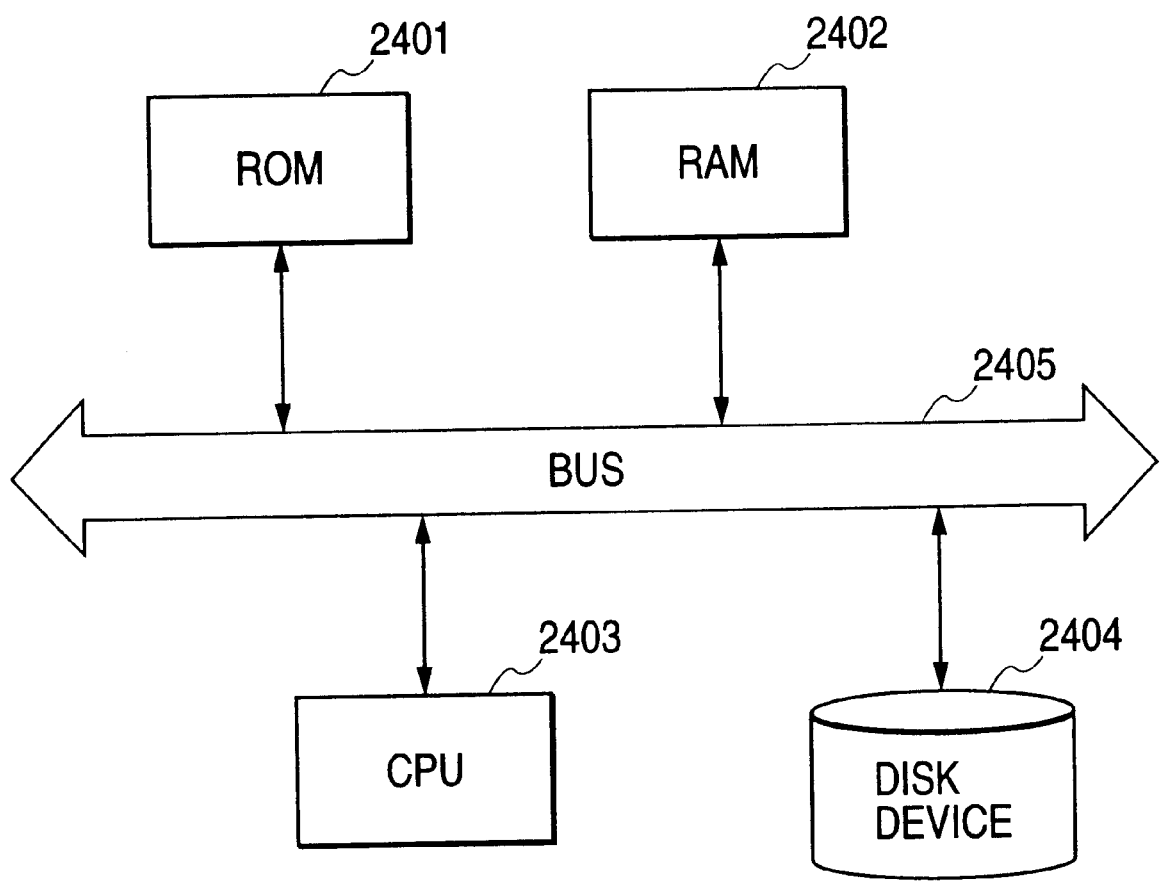
FIG. 24 is a block diagram showing the hardware configuration of the text search apparatus shown in FIG. 23.

As shown in FIG. 24, the hardware configuration of the text search apparatus is provided with a central processing unit 2403 for executing a process according to a program stored in a ROM 2403; a RAM 2402 for providing a work area for temporarily storing the operation result of the central processing unit 2403; a disk device 2404; and a bus 2405 connecting these units. The program stored in the ROM 2401 contains program modules for constituting the above-mentioned page generating portion 2402, segment generating portion 2403, index generating portion 2406, search portion 2411 and display result generating portion 2413. The result displaying portion 2414 is constituted by a display such as a CRT (not shown), and the display unit designating portion 2415 is constituted for example by a keyboard or a mouse (not shown).

In the following there will be explained the processing function of the present text search apparatus with reference to FIGS. 25A to 25C and 26, which are respectively a flow chart indicating the sequence of an index preparation process in the text search apparatus shown in FIG. 23 and a flow chart indicating the sequence of a search process in the text search apparatus shown in FIG. 23.

Figure 25A:
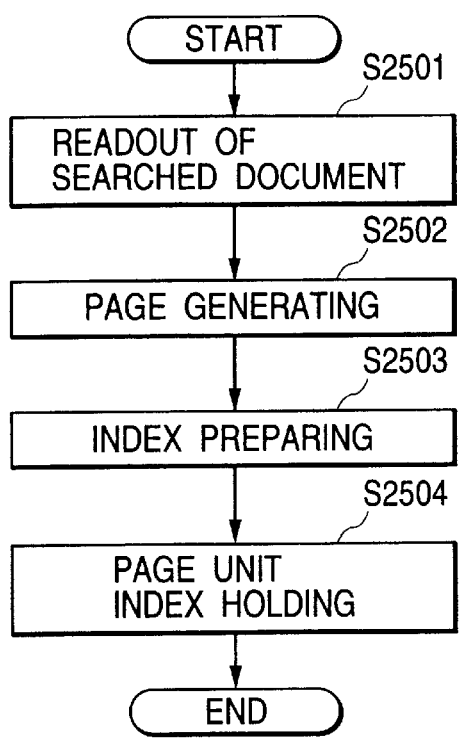
FIGS. 25A, 25B and 25C are flow charts showing the sequence of an index preparation process in the text search apparatus shown in FIG. 23.

The index preparation process of the present text search apparatus executes the index preparation of page, index preparation of segment and index preparation of searched document in parallel. In the page index preparation, as shown in FIG. 25A, at first a step S2501 reads the searched document held in the searched document holding portion 2301, and a succeeding step S2502 causes the page generating portion 2302 to divide the searched document in the page unit according to the content thereby generating the page of search object, and stores the generated page in the page holding portion 2304.

Then a step S2503 causes the index generating portion 2306 to read the page held in the page holding portion 2304 to prepare the page unit index. A step S2504 stores the page unit index, together with the page of search object, in the page unit index holding portion 2308.

Figure 25B:
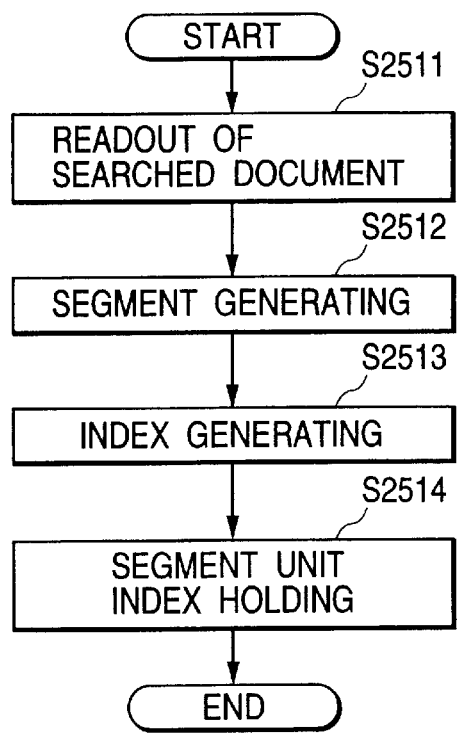

In the segment index preparation, as shown in FIG. 25B, at first a step S2511 reads the searched document held in the searched document holding portion 2301, and a succeeding step S2512 causes the segment generating portion 2303 to divide the searched document in the segment unit according to the content thereby generating the segments of search object, and stores the generated segments in the segment holding portion 2305.

Then a step S2513 causes the index generating portion 2306 to read the segment held in the segment holding portion 2305 to prepare the segment unit index. A step S2514 stores the segment unit index, together with the segment of search object, in the segment unit index holding portion 2309.

Figure 25C:
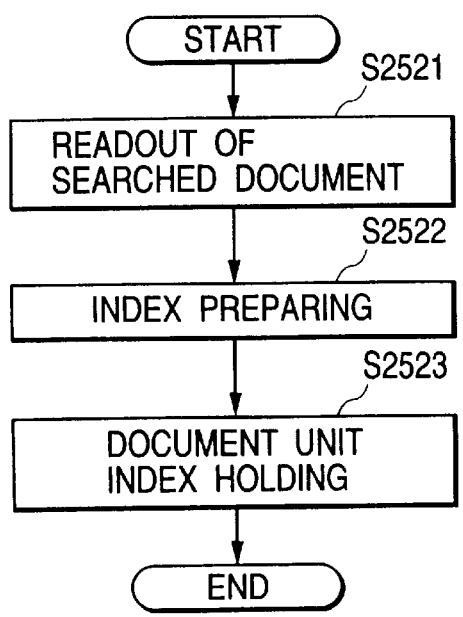

In the index preparation of the searched document, as shown in FIG. 25C, at first a step S2521 reads the searched document held in the searched document holding portion 2301, and a succeeding step S2522 causes the index preparing portion 2306 to prepare the document unit index. Then a step S2523 stores the document unit index, together with the searched document, in the document unit index holding portion 2307.

In this manner there are prepared searching indexes, consisting of the document unit index, the page unit index and the segment unit index respectively representing the search objects.

In the foregoing there has been explained a case of preparing the indexes of the page, segment and searched document in parallel, but such preparations may be executed in succession.

Figure 26:
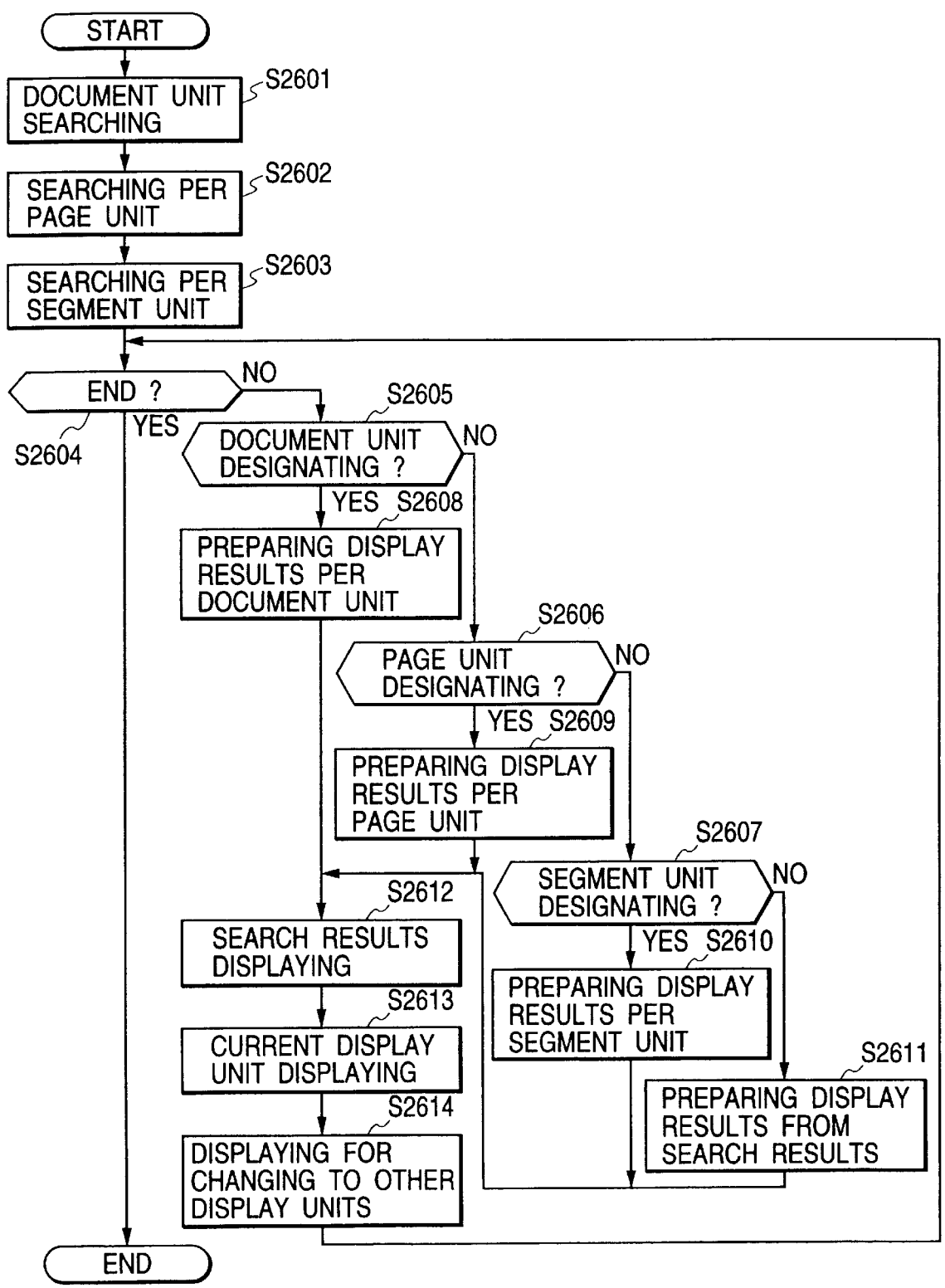
FIG. 26 is a flow chart showing the sequence of a search process in the text search apparatus shown in FIG. 23.

Then executed is the search process. In this search process, as shown in FIG. 26, at first a step S2601 executes the search in the unit of document, by referring to the document unit index. More specifically, in this operation, a character train constituting the search key and held the search key holding portion 2310 is searched in the searched document represented by the document unit index, and the result of such search is stored in the search result holding portion 2312.

Then a step S2602 executes the search in the unit of page, by referring to the page unit index. More specifically, in this operation, the character train constituting the search key and held in the search key holding portion 2310 is searched in the page represented by the page unit index, and the result of such search is stored in the search result holding portion 2312.

Then a step S2603 executes the search in the unit of segment, by referring to the segment unit index. More specifically, in this operation, the character train constituting the search key and held in the search key holding portion 2310 is searched in the segment represented by the segment unit index, and the result of such search is stored in the search result holding portion 2312.

Then a step S2604 discriminates whether the termination of the present process is instructed by the user, and, if instructed, the present process is terminated, but, if not, the sequence proceeds to a step S2605, judging that the user designates the display unit by the display unit designating portion 2315.

A step S2605 discriminates whether the document unit is designated as the display unit. In case the document unit is not designated as the display unit, the sequence proceeds to a step S2606 to discriminate whether the page unit is designated as the display unit. In case the page unit is not designated as the display unit, the sequence proceeds to a step S2607 to discriminate whether the segment unit is designated as the display unit. In case the segment unit is not designated as the display unit, judging that the display unit is not designated by the user, the sequence proceeds to a step S2611 for reading the search result of the default display unit from the search result holding portion 2312 and preparing a display result including this search result and the information indicating such display unit. Such default display unit can be any of the document unit, page unit and segment unit.

Then a step S2612 displays the search result contained in the prepared display result (search result of the default display unit in this case) on the result display portion 2314, and a next step S2613 displays the display unit contained in the display result (default value in the present case) on the result display portion 2314. Then a step S2614 displays, on the display image of the search result, a menu image for switching to another display unit. The user can designated a desired display unit on this menu image. When the display unit is designated, it is discriminated in the foregoing steps S2605, S2606 and S2607.

In case the foregoing step S2605 discriminates that the document unit is designated as the display unit, the sequence proceeds to a step S2608 for causing the display result display portion 2313 to read the search result of the document unit from the search result holding portion 2312 and to prepare a display result including such search result and the information indicating the display unit therein. Then a step S2512 displays the search result (of the document unit in the present case) contained in the prepared display result on the result display portion 2314, and a next step S2613 displays, on the result display portion 2314, the display unit (of document unit in the present case) contained in the display result. Then a step S2614 displays, on the display image of the search result, a menu image for switching to another display unit.

In case the foregoing step S2606 identifies that the page unit is designated as the display unit, the sequence proceeds to a step S2609 for causing the display result generating portion 2313 to read the search result of page unit from the search result holding portion 2312 and to prepare the display result including such search result and the information indicating the display unit therein. Then the sequence proceeds to the step S2612 for displaying the search result (of the page unit in the present case) contained in the prepared display result on the result display portion 2314, and the next step S2613 displays, on the result display portion 2314, the display unit (of page unit in the present case) contained in the display result. Then the step S2614 displays, on the display image of the search result, a menu image for switching to another display unit.

In case the foregoing step S2607 identifies that the segment unit is designated as the display unit, the sequence proceeds to a step S2610 for causing the display result generating portion 2313 to read the search result of segment unit from the search result holding portion 2312 and to prepare the display result including such search result and the information indicating the display unit therein. Then the sequence proceeds to the step S2612 for displaying the search result (of the segment unit in the present case) contained in the prepared display result on the result display portion 2314, and the next step S2613 displays, on the result display portion 2314, the display unit (of segment unit in the present case) contained in the display result. Then the step S2614 displays, on the display image of the search result, a menu image for switching to another display unit.

As explained in the foregoing, the present embodiment executes search in plural search units and the display of the search result in each search unit is switched according to the designation of the user, so that the intended search result can be easily obtained.

Ninth Embodiment

In the following there will be explained a ninth embodiment of the present invention with reference to FIG. 27, which is a block diagram showing the configuration of a text search apparatus constituting the ninth embodiment.

Figure 27:
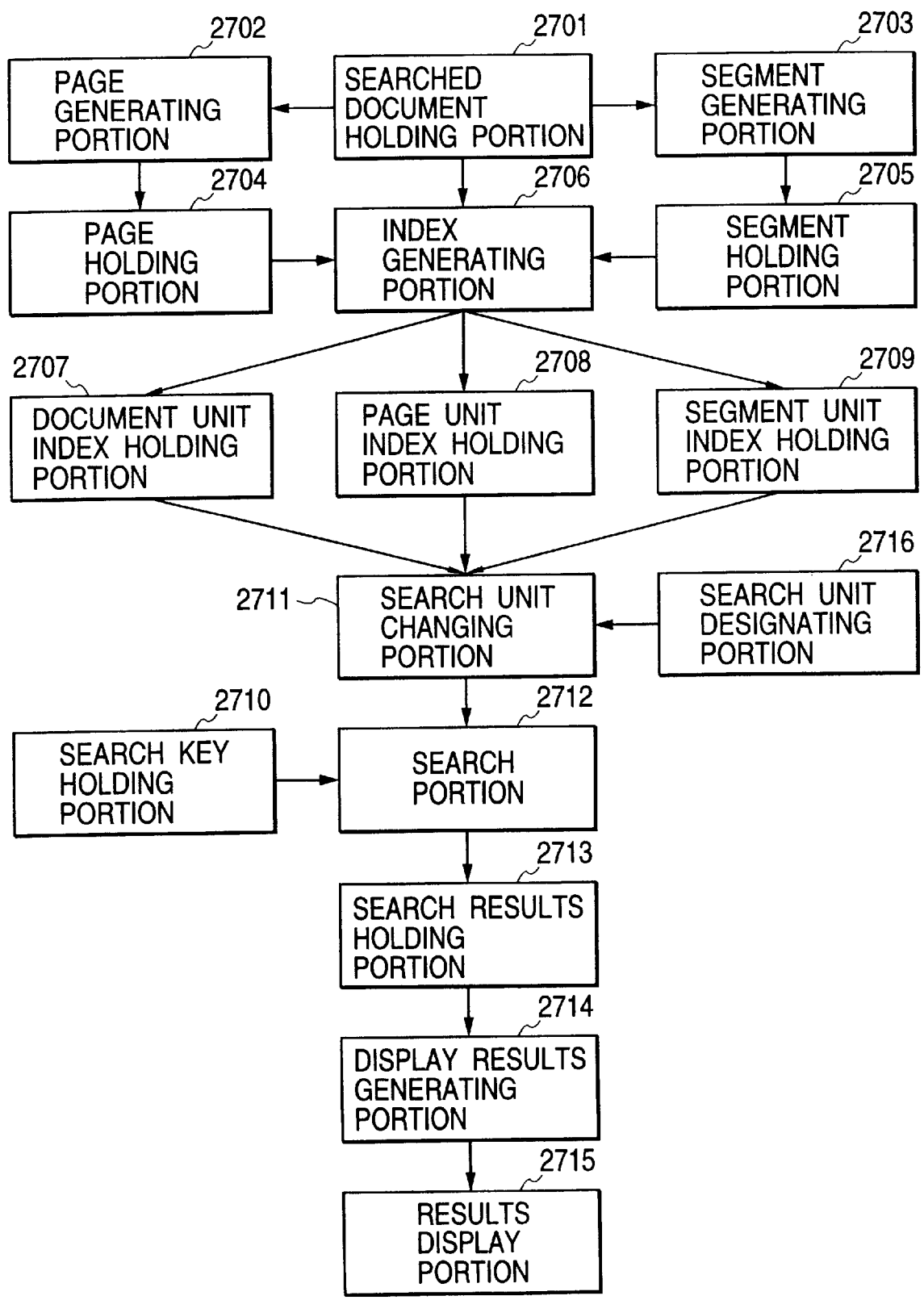
FIG. 27 is a block diagram showing the configuration of a text search apparatus constituting a ninth embodiment of the present invention.

As shown in FIG. 27, the text search apparatus is provided with a search document holding portion 2701 for holding the searched document; a page generating portion 2702 for dividing the searched document, held in the searched document holding portion 2701, in the page unit according to the content thereof thereby forming pages of the search object; a page holding portion 2704 for holding the pages generated in the page generating portion 2702; a segment generating portion 2703 for dividing the searched document in the segment unit according to the content thereof thereby forming segments of search object; and a segment holding portion 2705 for holding the segments generated by the segment generating portion 2703.

The search objects, namely the searched document held in the searched document holding portion 2701, the page held in the page holding portion 2704 and the segment held in the segment holding portion 2705, are entered in the index preparing portion 2706, which in response prepares the search indexes, namely the document unit index, the page unit index and the segment unit index respectively representing the entered search objects. The prepared document unit index is held, together with the searched document, in he index holding portion 2707, while the prepared page unit index is held together with the page of the search object in the page unit index holding portion 2708, and the prepared segment unit index is held together with the segment of the search object in the segment unit index holding portion 2709.

The search objects respective held in the document unit index holding portion 2707, the page unit index holding portion 2708 and the segment unit index holding portion 2709 are read out by switching by the search unit changing portion 2711. More specifically, the search object of a search unit designated by the search unit designating portion 2716 is read from the corresponding holding portion, and the read search object is entered into the search unit 2712, which executes the search of the search character train held in the search key holding portion 2710, on the entered search object, and the result of such search is held in the search result holding portion 2713. The search unit designating portion 2716 is provided with operation means such as a key or a mouse for designating one of the document unit, page unit and segment unit, and the search unit can be designated on the search unit menu image, by the operation of such operation means.

The search result held in the search result holding portion 2713 is entered into the display result generating portion 2714, which generates display information representing the search result of the search object and the search unit thereof and also generates display the search unit menu image information for changing the search unit. The display information generated by the display result generating portion 2714 is entered into the result display portion 2715, which displays, based on the entered display information, the search result of the search object corresponding to the designated search unit and the information indicating the search unit thereof, and also display the search unit menu image based on the above-mentioned search unit menu image information. In case, in the course of display of the search result in the designated search unit, another search unit different from the above-mentioned designated search unit is designated on the search unit menu image, there is executed the search of the search object corresponding to such designated another search unit, and the display result generating portion 2714 generates display information representing the search result of the search object of another search unit and the information indicating the search unit thereof, in order to switch the display of such search result, and thus generated display information is displayed by the result display portion 2715.

As explained in the foregoing, in the present embodiment, for each designation of the search unit, the search is executed for the search object of such search unit, and the obtained search result is displayed. Thus the search in the search unit desired by the user can be executed by easy switching, and the intended search result can therefore be obtained easily.

Tenth Embodiment

In the following there will be explained a tenth embodiment of the present invention with reference to FIGS. 28 and 29 which are respectively a block diagram of a database preparation apparatus for supplying a text search apparatus constituting a tenth embodiment of the present invention with search object, and a block diagram showing the configuration of the text search apparatus for executing search with the search object supplied from the database preparation apparatus shown in FIG. 28.

In contrast to the foregoing eighth and ninth embodiments in which the index preparation process and the search process are executed in an apparatus, the present embodiment is different in that the index preparation process is executed by a database preparation apparatus and the search process is executed on the search object supplied from such database preparation apparatus.

Figure 28:
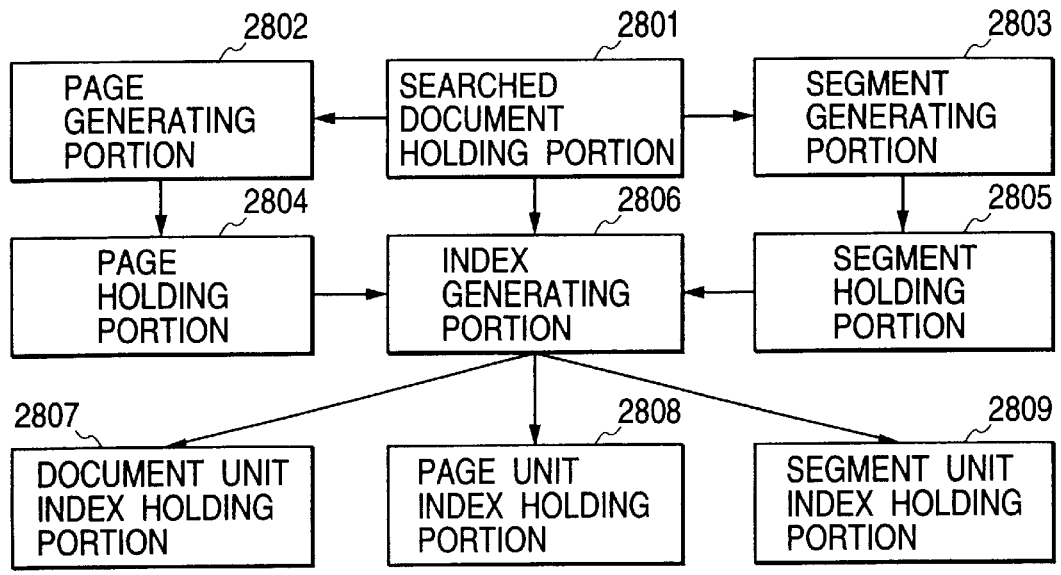
FIG. 28 is a block diagram showing the configuration of a database preparation apparatus for supplying an object of search to a text search apparatus constituting a tenth embodiment of the present invention.

As shown in FIG. 28, the database preparation apparatus is provided with a searched document holding portion 2801 for holding the searched document; a page generating portion 2802 for dividing the search document, held in the searched document holding portion 2801, in the page unit according to the content thereof thereby generating pages as the search object; a page holding portion 2804 for holding the pages generated by the page generating portion 2802; a segment generating unit 2803 for dividing the searched document in the segment unit according to the content thereof thereby generating segments as the search object;

and a segment holding portion 2805 for holding the segments generated by the segment generating portion 2803.

The search objects, namely the search document held in the searched document holding portion 2801, the page held in the page holding portion 2804 and the segment held in the segment holding portion 2805, are entered into an index preparing portion 2806, which prepares the search indexes, namely the document unit index, page unit index and segment unit index respectively representing the entered search objects. Thus prepared document unit index is held together with the searched document in the document unit index holding portion 2807, while the page unit index is held together with the page of the search object in the page unit index holding portion 2808, and the segment unit index is held together with the segment of the search object in the segment unit index holding portion 2809.

The search objects held respectively in the document unit index holding portion 2807, the page unit index holding portion 2808 and the segment unit index holding portion 2809 are supplied to the text search apparatus for example through a communication cable or a portable memory medium.

Figure 29:
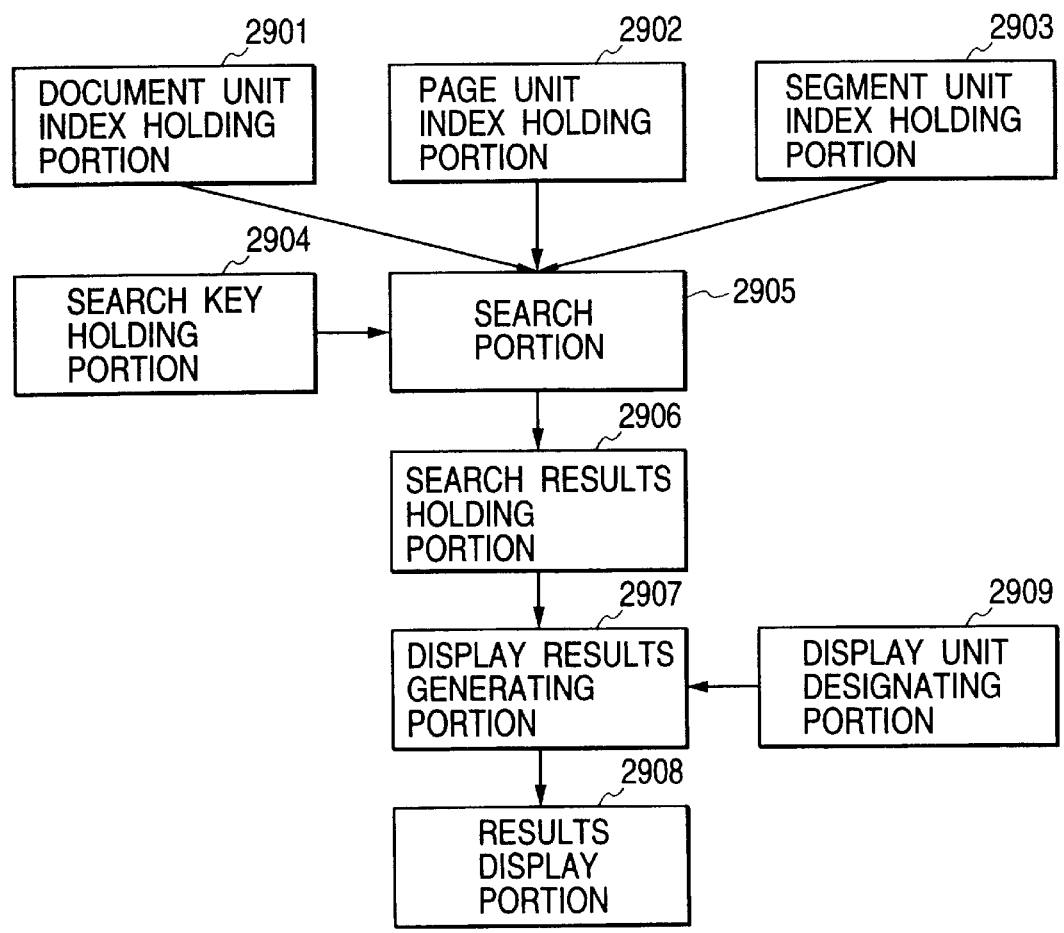
FIG. 29 is a block diagram showing the configuration of a text search apparatus for executing search with the object of search supplied from the database preparation apparatus shown in FIG. 28.

As shown in FIG. 29, the text search apparatus is provided with a document unit index holding portion 2901 for holding the document unit index and the searched document supplied from the database preparation apparatus; a page unit index holding portion 2902 for holding the page unit index and the page of the search object; and a segment unit holding portion 2903 for holding the segment unit index and the segment of the search object.

The search objects, respectively held in the document unit index holding portion 2901, the page unit index holding portion 2902 and the segment unit index holding portion 2903, are entered into a search unit 2905, which executes search of the search character train held in the search key holding portion 2904, on each search object represented by respective search index. The search result obtained in this search for each search object represented by the search index is held in a search result holding portion 2906.

The search results held in the search result holding portion 2906 are entered into a display result generating portion 2907, which generates display information representing the search result of the search object corresponding to the display unit designated by a display unit designating portion 2909 and information indicating the display unit therein, and also generates display unit menu image information for switching the display unit. The display unit designating unit 2909 is provided with operation means such as a key or a mouse for designating one of the document unit, page unit and segment unit as the display unit for the search result, and the display unit can be designated on the display unit menu image by the operation of the operation means.

The display information generated by the display result generating portion 2907 is entered into a result display portion 2908, which, based on the entered display information, displays the search result of the search object corresponding to the designated display unit and the information indicating the display unit thereof, and also displays the display unit menu image based on the above-mentioned display unit menu image information. In case, in the course of display of the search result with the designated display unit, another display different from the designated display unit is designated, display information representing the search result of the search object corresponding to such another display unit and information indicating the display unit thereof is generated by a display result generating portion 2907 switching the display to the search result of the search object corresponding to thus designated another display unit and the information indicating such display unit, and thus generated display information is displayed by a result displaying portion 2908.

In the foregoing embodiments, there is explained a case of employing the document unit, page unit and segment unit and the search units, but such configuration is not respective and there may be set other search units.

Also in the foregoing embodiments, the search index is prepared for each search unit, but it is also possible to prepare an index having search unit information, and to extract the corresponding search object from the index, utilizing such search unit information.

Also the foregoing embodiments utilizing the menu image for switching the search unit, but it is also possible to utilize another user interface. For example the switching can be achieved by displaying icons or the like.

Also in the foregoing embodiments, there have been explained the page dividing method and the segment dividing method in case the searched document is an HTML document, but such dividing methods are not restrictive and there may be adopted an arbitrary dividing method, for example the dividing method based on the natural language process. Such methods may also be applied to another searched document, for example a document prepared by a word processor.

Also in the foregoing embodiments, there is displayed information indicating the search unit of the currently displayed search result, but it is possible to represent the search unit by varying the display form of the search result. For example the search unit may be represented by changing the display color of the search result.

Also in the foregoing first and second embodiments, the blocks are constituted on a same apparatus, but such blocks may be constituted by computers or processing apparatus dispersed on a network.

Also in the foregoing embodiments, the program for constituting the blocks is stored in a ROM, but it may instead be stored in another memory medium. For example the above-mentioned program may be stored for example in a disk device and executed by reading therefrom. The above-mentioned program may be supplied from a memory medium such as a CDROM, an MO, an FD or a memory card. It may also be constituted by a hardware circuit for executing a process corresponding to each block.

What is claimed is:

1. An index preparation apparatus for preparing a search index of a searched document, which contains characters interpretable as commands by an index processing apparatus for processing said document, comprising:

a searched document holding means for holding said searched document;

document dividing means for extracting, from said searched document held in said searched document holding means, first segments according to said characters interpretable as command;

determining means for determining levels of association between the first segments based on information in the first segments;

cohesion process means for integrating said first segments according to the determined result by said determining means level of association thereof, thereby forming second segments; and index generation means for generating said search index for each of said second segments.

2. An index preparation apparatus according to claim 1, wherein, in case said searched document contains image data, said cohesion process means includes an image data process portion for executing an integration process for discriminating a first association level indicating the level of association of said image data and the preceding and succeeding document and integrating said image data and said preceding and/or succeeding first segment according to said first association level, and is adapted to execute an integrating process to said second segments, utilizing said first segments after the integrating process.

3. An index preparation apparatus according to claim 1, wherein said cohesion process means includes header process means for detecting from said first segments, segments containing the header of said searched document and adding information relating to said header to said first segments contained in a same header.

4. An index preparation apparatus according to claim 1, wherein, said cohesion process means includes division/integration means for dividing said first segments into predetermined units with predetermined characters, detecting a second association level indicating the level of mutual association of said predetermined units, and integrating adjacent predetermined units having a predetermined second association level thereby forming said second segments.

5. An index preparation apparatus according to claim 2, wherein said image data process portion is adapted to add, to said first segments integrated with said image data, information relating to said integrated image data and to said first association level.

6. An index preparation apparatus according to claim 3, wherein said index preparing means is adapted to prepare said search index separately for each of said header information of said second segments and a part of said second segments other than said information relating to the header.

7. A document search apparatus for searching a document relating to a given key from a group of searched documents using one or more search indexes, the apparatus comprising:
    index forming means for forming said one or more search indexes, each search document containing characters interpretable as commands, said index forming means comprising:
        a searched document holding means for holding said searched document;
        document dividing means for extracting, from said searched document held in said searched document holding means, first segments according to said characters interpretable as command;
        determining means for determining levels of association between the first segments based on information in the first segments;
        cohesion process means for integrating said first segments according to the determined result by said determining means level of association thereof, thereby forming second segments; and
        index generation means for generating said search index for each of said second segments;
    search means for searching each of plural groups of search indexes, which are given in each of said searched documents, with said key and determining the level of association of said searched document with said key, based on a result obtained by synthesizing the respective search results with a predetermined weighting; and
    final search result holding means for holding, as a final search result, said searched document of which level of association satisfies a predetermined condition.

8. A document search apparatus according to claim 7, wherein said cohesion process means includes header process means for detecting from said first segments, segments containing the header of said searched document and adding information relating to said header to said first segments contained in a same header, and wherein said plural groups of indexes are search indexes prepared by said index preparing means, said index preparing means adapted to prepare a search index for each of said header information of said second segments and a part of said second segments other than said information relating to the header, and wherein said searched document is said second segment.

9. A text search system composed of an index generating portion for generating a search index of a searched document, which contains characters interpretable as commands by an index processing apparatus for processing said document, and a search portion for searching documents relating to a given key from a group of searched documents, wherein:
    said index generating portion comprises:
        a searched document holding portion for holding said searched document;
        document dividing means for extracting, from said searched document held in said searched document holding portion, first segments according to said characters;
        determining means for determining levels of association between the first segments based on information in the first segments;
        cohesion process means for integrating said first segments according to the determined result by said determining means level of association thereof, thereby forming second segments; and
        index preparation means for preparing said search index for each of said second segments and for said header-related information; and
    said search portion comprises: search means for searching said search index with said key and determining the level of association of said search document relative to said key; and
        final search result holding portion for holding, as the final search result, said searched document of which said association level satisfies a predetermined condition.

10. A text search system according to claim 9, wherein, in case said searched document contains image data, said cohesion process means includes an image data process portion for executing an integration process for discriminating a first association level indicating the level of association of said image data and the preceding and succeeding document and integrating said image data and said preceding and/or succeeding first segment according to said first association level, and is adapted to execute an integrating process to said second segments, utilizing said first segments after the integrating process.

11. A text search system according to claim 9, wherein said cohesion process means includes header process means for detecting, from said first segments, segments, containing the header of said searched document and adding information relating to said header to said first segments contained in a same header.

12. A text search system according to claim 9, wherein, said cohesion process means includes division/integration means for dividing said first segments into predetermined units with predetermined characters, detecting a second association level indicating the level of mutual association of said predetermined units, and integrating adjacent predetermined units having a predetermined second association-level thereby forming said second segments.

13. A text search system according to claim 10, wherein said image data process portion is adapted to add, to said first segments integrated with said image data, information relating to said integrated image data and to said first association level.

14. A text search system according to claim 10, wherein said cohesion process means includes header process means for detecting, from said first segments, segments containing the header of said searched document and adding information relating to said header to said first segments contained in a same header; and said index generating means is adapted to individually generate said search index for said header information of said second segments and for a part of said second segments other than the information relating to said header; and said search portion includes search means for determining the level of association of said search document relative to said key based on a result obtained by searching said individual search indexes with said key and synthesizing the respective search results with a predetermined weighting; and final search result holding portion for holding, as the final search result, said searched document of which said association level satisfies a predetermined condition.

15. An index preparation method for preparing a search index of a searched document, which contains characters interpretable as commands by an index processing method for processing said document, the method comprising:
   a searched document holding step of holding said searched document in memory means;
   a document dividing step of extracting, from said searched document held in said memory means, first segments according to said characters interpretable as command;
   determining means for determining levels of association between the first segments based on information in the first segments;
   a cohesion process step of integrating said first segments according to the determined result by said determining means level of association thereof, thereby forming second segments; and
   an index generation step of generating said search index for each of said second segments.

16. An index preparation method according to claim 15, wherein, in case said searched document contains image data, said cohesion process step includes an image data process step for executing an integration process of discriminating a first association level indicating the level of association of said image data and the preceding/succeeding document and integrating said image data and said preceding and/or succeeding first segment according to said first association level, and is adapted to execute an integrating process to said second segments, utilizing said first segments after the integrating process.

17. An index preparation method according to claim 15, wherein said cohesion process step includes a header process step of detecting, from said first segments, segments containing the header of said searched document and adding information relating to said header to said first segments contained in a same header.

18. An index preparation method according to claim 15, wherein, said cohesion process step includes a division/integration step of dividing said first segments into predetermined units with predetermined characters, detecting a second association level indicating the level of mutual association of said predetermined units, and integrating adjacent predetermined units having a predetermined second association level thereby forming said second segments.

19. An index preparation method according to claim 16, wherein said image data process step is adapted to add, to said first segments integrated with said image data, information relating to said integrated image data and to said first association level.

20. An index preparation method according to claim 17, wherein said index generation step is adapted to generate said search index separately for each of said header information of said second segments and a part of said second segments other than said information relating to the header.

21. A document search method for searching a document, relating to a given key from a group of searched documents using one or more search indexes, the method comprising:
   a step of forming the one or more search indexes for the searched documents, each search document containing characters interpretable as commands, said index forming step comprising:
      a searched document holding step of holding said searched document in memory means;
      a document dividing step of extracting, from said searched document held in said memory means, first segments according to said characters interpretable as command;
      determining means for determining levels of association between the first segments based on information in the first segments;
      a cohesion process step of integrating said first segments according to the determined result by said determining means level of association thereof, thereby forming second segments;
      an index generation step of generating said search index for each of said second segments;
   a search step of searching each of plural groups of search indexes, which are given in each of said searched documents, with said key and determining the level of association of said searched document with said key, based on a result obtained by synthesizing the respective search results with a predetermined weighting; and
   a final search result holding step of holding, as a final search result, said searched document of which level of association satisfies a predetermined condition.

22. A storage medium storing program codes for index preparation for preparing a search index of a searched document, which contains characters interpretable as commands by an index processing apparatus for processing said document, the program codes comprising:
   program codes of a searched document holding step of holding said searched document in memory means;
   program codes of a document dividing step of extracting, from said searched document held in said memory means, first segments according to said characters interpretable as command;
   program codes of a cohesion process step of integrating said first segments according to the level of association thereof, thereby forming second segments; and
   program codes of an index generation step of generating said search index for each of said second segments.

23. A storage medium storing search program codes for searching a document relating to a given key from a group of searched documents using one or more search indexes, the program codes comprising:
   program codes of forming the one or more search indexes for the searched documents, each search document containing characters interpretable as commands, said index forming program codes comprising:

program codes of a searched document holding step of holding said searched document in memory means;

program codes of a document dividing step of extracting, from said searched document held in said memory means, first segments according to said characters interpretable as command;

program codes of a determining step for determining levels of association between the first segments based on information in the first segments;

program codes of a cohesion process step of integrating said first segments according to the determined level of association thereof, thereby forming second segments;

program codes of an index generation step of generating said search index for each of said second segments;

program codes of a search step of searching each of plural groups of search indexes, which are given in each of said searched documents, with said key and determining the level of association of said searched document with said key, based on a result obtained by synthesizing the respective search results with a predetermined weighting; and program codes of a final search result holding step of holding, as a final search result, said searched document of which level of association satisfies a predetermined condition.

24. A storage medium storing program codes of a search system for executing an index generating process for generating a search index of a searched document, which contains characters interpretable as commands by an index processing apparatus for processing said document, and a search process for searching documents relating to a given key from a group of searched documents, the program codes comprises:

those of said index generating process including:

program codes of a searched document holding step of holding said searched document; program codes of a document dividing step of extracting, from said searched document held in said searched document holding step, first segments according to said characters;

program codes of a determining step for determining levels of association between the first segments based on information in the first segments;

program codes of a cohesion process step of integrating said first segments according to the determined result by said determining step level of association thereof, thereby forming second segments; and program codes of an index preparation step of preparing said search index for each of said second segments and for said header-related information; and those of said search process including:

program codes of a search step of searching said search index with said key and determining the level of association of said search document relative to said key; and program codes of a final search result holding step of holding, as the final search result, said searched document of which said association level satisfies a predetermined condition.

25. A document search apparatus for searching a desired document from plural documents, comprising:

segment generation means for dividing the searched document into segments according to the content;

object identifying means for identifying the object of the searched document;

index preparation means for preparing a search index based on the segments generated by said segment generation means and the searched document with object;

search unit switching means for selecting appropriate one of a segment unit index prepared from said segments by said index preparation means and a document unit index prepared from said searched document with object; and search means for searching a character train coinciding with a search character train based on the index selected by said search unit switching means.

26. A document search apparatus according to claim 25, further comprising:

presentation result generating means for discriminating the number of the search results searched by said search means and executing instruction for switching the search unit to said search unit switching means or generation of the search result to be presented; and result presenting means for outputting the presentation result generated by said presentation result generation means.

27. A document search apparatus according to claim 25, further comprising:

searched document holding means for holding the searched document; segment holding means for holding the segments generated by said segment generation means; searched document/object holding means for holding the object identified by said object identifying means together with said searched document; segment unit index holding means for holding the search index prepared by said index preparing means based on the segments held in said segment holding means; document unit index holding means for holding the search index prepared by said index preparing means based on the searched document with object held in said searched document/object holding means; search key holding means for holding a character train for executing search; and search result holding means for holding the search result searched by said search means.

28. A document search apparatus for searching a desired document from plural documents comprising:

search unit switching means for selecting appropriate one of a segment unit index and a document unit index; and search means for searching a character-train coinciding with a search character train, based on the index selected by said search unit switching means.

29. A document search apparatus according to claim 28, further comprising:

presentation result generating means for discriminating the number of the search results searched by said search means and executing instruction for switching the search unit to said search unit switching means for generation of the search result to be presented; and result presenting means for outputting the presentation result generated by said presentation result generation means.

30. A document search apparatus according to claim 28, further comprising:

segment unit index holding means for holding the segment unit index supplied from an external apparatus; document unit index holding means for holding the document unit index supplied from an external apparatus; search key holding means for holding a character train for search; and search result holding means for holding the search result searched by said search means.

31. A document search apparatus according to claim 26, wherein said presentation result generation means instructs said search unit switching means to switch to the document unit index in case the number of search results of the segment unit index exceeds a threshold value, while it selects the search result of the segment unit as the preparation result in case the threshold value is not exceeded, also it generates the presentation result by collecting the search results for each object in case the number of search results of the document unit index exceeds a threshold value, and it selects the search result of the document unit as the presentation result in case the threshold value is not exceeded.

32. A document search apparatus according to claim 25, wherein indexes of various units are prepared and can be used by switching.

33. A document search apparatus according to claim 25, wherein the object of the segment is also identified, and the presentation result utilizing the object can be generated according to the number of search results of the segment unit.

34. A document search apparatus according to claim 25, wherein the search can be executed by switching the indexes of plural units, without identifying the object.

35. A document search apparatus according to claim 25, wherein the search unit can be designated by an external input.

36. A document search apparatus according to claim 25, wherein said means can be dispersed in external apparatus on a network.

37. A document search method for searching a desired document from plural documents, comprising:
a segment generation step of dividing the searched document into segments according to the content,
an object identifying step of identifying the object of the searched document;
an index preparation step of preparing a search index based on the segments generated by said segment generation step and the searched document with object;
a search unit switching step of selecting appropriate one of a segment unit index prepared from said segments by said index preparation step and a document unit index prepared from said searched document with object; and
a search step of searching a character train coinciding with a search character train based on the index selected by said search unit switching step.

38. A document search method according to claim 37, further comprising:
a presentation result generating step of discriminating the number of the search results searched by said search step and executing instruction for switching the search unit to said search unit switching step or generation of the search result to be presented; and
a result presenting step of outputting the presentation result generated by said presentation result generation step.

39. A document search method according to claim 37, further comprising:
a searched document holding step of holding the searched document; a segment holding step of holding the segments generated by said segment generation step; a searched document/object holding step of holding the object identified by said object identifying step together with said searched document; a segment unit index holding step of holding the search index prepared by said index preparing step based on the segments held in said segment holding step; a document unit index holding step of holding the search index prepared by said index preparing step based on the searched document with object held in said searched document/object holding step; a search key holding step of holding a character train for executing search; and a search result holding step of holding the search result searched by said search step.

40. A document search method adapted for use in a document search apparatus for searching a desired document from plural documents, comprising:
a search unit switching step of selecting appropriate one of a segment unit index and a document unit index; and
a search step of searching a character train coinciding with a search character train, based on the index selected by said search unit switching step.

41. A document search method according to claim 40, further comprising;
a presentation result generating step of discriminating the number of the search results searched by said search step and executing instruction for switching the search unit to said search unit switching step or generation of the search result to be presented; and
a result presenting step of outputting the presentation result generated by said presentation result generation step.

42. A document search method according to claim 40, further comprising:
a segment unit index holding step of holding the segment unit index supplied from an external apparatus; a document unit index holding step of holding the document unit index supplied from an external apparatus; a search key holding step of holding a character train for search; and a search result holding step of holding the search result searched by said search step.

43. A document search method according to claim 38, wherein said presentation result generation step instructs said search unit switching step to switch to the document unit index in case the number of search results of the segment unit index exceeds a threshold value, while it selects the search result of the segment unit as the preparation result in case the threshold value is not exceeded, also it generates the presentation result by collecting the search results for each object in case the number of search results of the document unit index exceeds a threshold value, and it selects the search result of the document unit as the presentation result in case the threshold value is not exceeded.

44. A document search method according to claim 37, wherein indexes of various units are prepared and can be used by switching.

45. A document search method according to claim 37, wherein the object of the segment is also identified, and the presentation result utilizing the object can be generated according to the number of search results of the segment unit.

46. A document search method according to claim 37, wherein the search can be executed by switching the indexes of plural units, without identifying the object.

47. A document search method according to claim 37, wherein the search unit can be designated by an external input.

48. A document search method according to claim 37, wherein said steps can be dispersed in external apparatus on a network.

49. A computer readable storage medium storing a program for executing a text search method for use in a text search apparatus for searching a desired document from plural documents, the method comprising a segment generation step of dividing the searched document into segments according to the content; an object identifying step of identifying the object of the searched document; an index preparation step of preparing a search index based on the segments generated by said segment generation step and the searched document with object; a search unit switching step of selecting appropriate one of a segment unit index prepared from said segments by said index preparation stop and a document unit index prepared from said searched document with object; and a search step of searching a character train coinciding with a search character train based on the index selected by said search unit switching step.

50. A storage medium according to claim 49, wherein said text search method further comprises a presentation result generating step of discriminating the number of the search results searched by said search step and executing instruction for switching the search unit to said search unit switching step or generation of the search result to be presented; and a result presenting step of outputting the presentation result generated by said presentation result generation step.

51. A storage medium according to claim 49, wherein said text search method further comprises a searched document holding step of holding the searched document; a segment holding step of holding the segments generated by said segment generation step; a searched document/object holding step of holding the object identified by said object identifying step together with said searched document; a segment unit index holding step of holding the search index prepared by said index preparing step based on the segments held in said segment holding step; a document unit index holding step of holding the search index prepared by said index preparing step based on the searched document with object held in said searched document/object holding step; a search key holding step of holding a character train for executing search; and a search result holding step of holding the search result searched by said search step.

52. A computer readable storage medium storing a program for executing a document search method adapted for use in a document search apparatus for searching a desired document from plural documents, the program comprising:
a search unit switching step of selecting appropriate one of a segment unit index and a document unit index; and
a search step of searching a character train coinciding with a search character train, based on the index selected by said search unit switching step.

53. A storage medium according to claim 52, wherein said document search method further comprises:
a presentation result generating step of discriminating the number of the search results searched by said search step and executing instruction for switching the search unit to said search unit switching step or generation of the search result to be presented; and
a result presenting step of outputting the presentation result generated by said presentation result generation step.

54. A storage medium according to claim 52, wherein said document search method further comprises;
a segment unit index holding step of holding the segment unit index supplied from an external apparatus; a document unit index holding step of holding the document unit index supplied from an external apparatus; a search key holding step of holding a character train for search; and a search result holding step of holding the search result searched by said search step.

55. A storage medium according to claim 50, wherein said presentation result generation step instructs said search unit switching step to switch to the document unit index in case the number of search results of the segment unit index exceeds a threshold value, while it selects the search result of the segment unit as the preparation result in case the threshold value is not exceeded, also it generates the presentation result by collecting the search results for each object in case the number of search results of the document unit index exceeds a threshold value, and it selects the search result of the document unit as the presentation result in case the threshold value is not exceeded.

56. A storage medium according to claim 49, wherein indexes of various units are prepared and can be used by switching.

57. A storage medium according to claim 49, wherein the object of the segment is also identified, and the presentation result utilizing the object can be generated according to the number of search results of the segment unit.

58. A storage medium according to claim 49, wherein the search can be executed by switching the indexes of plural units, without identifying the object.

59. A storage medium according to claim 49, wherein the search unit can be designated by an external input.

60. A storage niobium according to claim 49, wherein said steps can be dispersed in external apparatus on a network.

61. A document search apparatus for searching the searched document utilizing an input search character train and displaying the result of search on display means, comprising:
page generating means for dividing said searched document in the page unit according to the content, thereby generating pages constituting the search objects; segment generation means for dividing said searched document in the segment unit according to the content, thereby generating segments constituting the search objects; index preparation means for preparing, as the search indexes, a document unit index, a page unit index and a segment unit index, respectively representing said searched document, said page and said segment constituting the search objects; search means for executing search of said search character train on the search objects by referring to said search indexes constituted by said document unit index, page unit index and segment unit index; search result holding means for holding the search result obtained for each search object represented by each search index; display unit designating means for designating, as the display unit of the search result, the document unit, page unit or segment unit, and display control means adapted to display, on said display means, the search result of the search object corresponding to said designated display unit and the information indicating said display unit, and, in case another display unit different from said designated display unit is designated in the course of display of the search result by said designated display unit, to switch to display of the search result of the search object corresponding to thus designated another display unit.

62. A document search apparatus for searching the searched document utilizing an input search character train and displaying the result of search on display means, comprising;
page generating means for dividing said searched document in the page unit according to the content, thereby generating pages constituting the search objects; segment generation means for dividing said searched document in the segment unit according to the content, thereby generating segments constituting the search objects; index preparation means for preparing, as the search indexes, a document unit index, a page unit index and a segment unit index, respectively representing said searched document, said page and said segment constituting the search objects; selection means for selecting the search index from said document unit index, said page unit index and said segment unit index; search means for executing search of said search character train on the search object represented by said selected search index; search result holding means for holding the search result obtained from the search object represented by said selected search index; and display control means adapted to display, on said display means, the search result of said selected search index and information indicating said search index, and also to display a menu image for selecting the search index by said selection means, in the display image of the search result utilizing said selected search index, wherein said selection means is adapted, incase said search index is designated in the menu image for selecting the search index, to transfer said selected search index to said search means.

63. A document search apparatus comprising:

database preparation means comprising:
  search object generating means for dividing a searched document into plural search units according to the content, thereby generating plural search objects including said searched document; and
  index preparation means for preparing search indexes respectively representing said plural search objects, wherein said search indexes and said search objects respectively represented by said search indexes are supplied as a search database;

receiving means for receiving said search indexes and the search objects respectively represented by said search indexes;

search unit designating means for designating a search unit;

search means for executing a search of a character train on the search objects respectively represented by said search indexes according to a designated search unit to search a search object corresponding to said search unit;

a display control means for switchably controlling a display, on a display means, a search result of each of said search objects and information indicating the search object, wherein said display control means is adapted to display, on said display means, the search result of the search object corresponding to a designated search unit and the information indicating said search unit, and in case another search unit different from said designated search unit is designated, said search means executing a search according to said another search unit and said display control means is adapted to control the display means to display the search result of the search object corresponding to said another search unit.

64. A document search method for searching the searched document utilizing an input search character train and displaying the result of search on display means, comprising:
  a step of dividing said searched document in the page unit according to the content, thereby generating pages constituting the search objects; a step of dividing said searched document in the segment unit according to the content, thereby generating segments constituting the search objects; a step of preparing, as the search indexes, a document unit index, a page unit index and a segment unit index, respectively representing said searched document, said page and said segment constituting the search objects; a step of executing search of said search character train on the search objects by referring to said search indexes constituted by said document unit index, page unit index and segment unit index; a step of holding the search result obtained for each search object represented by each search index; a step of designating, as the display unit of the search result, the document unit, page unit or segment unit, and a step adapted to display, on-said display means, the search result of the search object corresponding to said designated display unit and the information indicating said display unit, and, in case another display unit different from said designated display unit is designated in the course of display of the search result by said designated display unit, to switch to display of the search result of the search object corresponding to thus designated another display unit.

65. A document search method for searching the searched document utilizing an input search character train and displaying the result of search on display means, comprising:
  a step of dividing said searched document in the page unit according to the content, thereby generating pages constituting the search objects; a step of dividing said searched document in the segment unit according to the content, thereby generating segments constituting the search objects; a step of preparing, as the search indexes, a document unit index, a page unit index and a segment unit index, respectively representing said searched document, said page and said segment constituting the search objects; a step of selecting the search index from said document unit index, said page unit index and said segment unit index; a step of executing search of said search character train on the search object represented by said selected search index; a step of holding the search result obtained from the search object represented by said selected search index; a step adapted to display, on said display means, the search result of said selected search index and information indicating said search index, and also to display a menu image for selecting the search index by said selection means, in the display image of the search result utilizing said selected search index, and a step adapted, in case said search index is designated in the menu image for selecting the search index, to execute search of the search object represented by said selected search index and to switch to display of the result of said search.

66. A storage medium storing a program for constituting a text search system for searching the searched document utilizing an input search character train and displaying the result of search on display means, the program comprising:
  a page generating module for dividing said searched document in the page unit according to the content, thereby generating pages constituting the search objects; a segment generating module for dividing said searched document in the segment unit according to the content, thereby generating segments constituting the search objects; an index preparation module for preparing, as the search indexes, a document unit index, a page unit index and a segment unit index, respectively representing said searched document, said page and said segment constituting the search objects; a search module for executing search of said search character train on the search objects by referring to said search indexes constituted by said document unit index, page unit index and segment unit index; a holding module for holding the search result obtained for each search object represented by each search index; a display unit designating step for designating, as the display unit of the search result, the document unit, page unit or segment unit; and a display control module adapted to display, on said display means, the search result of the search object corresponding to said designated display unit and the information indicating said display unit, and, in case another display unit different from said designated display unit is designated in the course of display of the search result by said designated display unit, to switch to display of the search result of the search object corresponding to thus designated another display unit.

67. A storage medium storing a program for constituting a text search system for searching the searched document utilizing an input search character train and displaying the result of search on display means, the program comprising:

a page generating module for dividing said searched document in the page unit according to the content, thereby generating pages constituting the search objects; a segment generating module for dividing said searched document in the segment unit according to the content, thereby generating segments constituting the search objects; an index preparation module for preparing, as the search indexes, a document unit index, a page unit index and a segment unit index, respectively representing said searched document, said page and said segment constituting the search objects; a selection module for selecting the search index from said document unit index, said page unit index and said segment unit index; a search module for executing search of said search character train on the search object represented by said selected search index; a holding module for holding the search result obtained from the search object represented by said selected search index; and a display control module adapted to display, on said display means, the search result of said selected search index and information indicating said search index, and also to display a menu image for selecting the search index by said selection means, in the display image of the search result utilizing said selected search index, wherein, in case said search index is designated in the menu image for selecting the search index, said search module executes search of the search object represented by said selected search index and said display control module switches the display of the search result to display of the search result of the search object represented by said selected search index.

* * * * *

UNITED STATES PATENT AND TRADEMARK OFFICE
CERTIFICATE OF CORRECTION

PATENT NO. : 6,631,373 B1
DATED : October 7, 2003
INVENTOR(S) : Noriko Otani et al.

It is certified that error appears in the above-identified patent and that said Letters Patent is hereby corrected as shown below:

Column 4,
Line 17, "an" should read -- a --.

Column 21,
Line 54, "held" should read -- held by --.

Column 23,
Line 50, "he" should read -- the --; and
Line 56, "respective" should read -- respectively --.

Column 37,
Line 23, "incase" should read -- in case --.

Signed and Sealed this

Twentieth Day of January, 2004

JON W. DUDAS
*Acting Director of the United States Patent and Trademark Office*